US009836792B2

(12) United States Patent
Dixon

(10) Patent No.: US 9,836,792 B2
(45) Date of Patent: Dec. 5, 2017

(54) SYSTEM AND METHOD FOR ASSET ACCUMULATION AND RISK MANAGEMENT

(76) Inventors: Deborah A Dixon, Milford, CT (US); Delores A Dixon, legal representative, Milford, CT (US)

( * ) Notice: Subject to any disclaimer, the term of this patent is extended or adjusted under 35 U.S.C. 154(b) by 1101 days.

(21) Appl. No.: 12/186,908

(22) Filed: Aug. 6, 2008

(65) Prior Publication Data

US 2009/0024478 A1    Jan. 22, 2009

Related U.S. Application Data

(63) Continuation of application No. 10/041,752, filed on Jan. 7, 2002, now Pat. No. 7,421,406.

(60) Provisional application No. 60/260,178, filed on Jan. 5, 2001.

(51) Int. Cl.
*G06Q 40/00* (2012.01)
*G06Q 40/08* (2012.01)
*G06Q 30/02* (2012.01)
*G06Q 40/02* (2012.01)
*G06Q 40/06* (2012.01)

(52) U.S. Cl.
CPC ......... *G06Q 40/08* (2013.01); *G06Q 30/0226* (2013.01); *G06Q 40/00* (2013.01); *G06Q 40/025* (2013.01); *G06Q 40/06* (2013.01)

(58) Field of Classification Search
CPC ...... G06Q 40/00; G06Q 40/08; G06Q 40/025; G06Q 40/06; G06Q 30/0226
See application file for complete search history.

(56) References Cited

U.S. PATENT DOCUMENTS

| 5,291,398 | A | * | 3/1994 | Hagan ............................... 705/4 |
| 5,644,727 | A | * | 7/1997 | Atkins ................. G06Q 20/102 705/40 |
| 5,775,734 | A | * | 7/1998 | George, Jr. ..................... 283/57 |
| 5,913,198 | A | * | 6/1999 | Banks ......................... 705/36 R |
| 6,012,043 | A | * | 1/2000 | Albright et al. ............ 705/36 R |
| 6,092,047 | A | * | 7/2000 | Hyman et al. ............. 705/36 R |
| 6,112,188 | A | * | 8/2000 | Hartnett ................ G06Q 40/02 705/36 R |

(Continued)

OTHER PUBLICATIONS

The Final Instance, Unemployment Insurance Going Private, A study of the Future Social Security Scenario in the UK and Germany, Andreas Cebulla, Innovation, Nov. 4, 2000.*

(Continued)

*Primary Examiner* — Edward Baird
(74) *Attorney, Agent, or Firm* — Meister Seelig & Fein LLP; Seth H. Ostrow

(57) ABSTRACT

The system and method of the present invention removes barriers that undermine efficient risk-management. The invention prioritizes consumers by predicting their unmet demand for risk protection. Once deemed eligible, consumers are enrolled and funds are allocated to the payment of a premium for income insurance, contribution to a financial vehicle such as a savings or investment product, and payment of a premium for savings loss insurance. Active participants are eligible for income protection in case of job loss, systematic savings and ownership of public equities, principal protection and incentives based on utilization. The system and method of the present invention is calibrated on an ongoing basis to the behaviors of target consumers.

30 Claims, 9 Drawing Sheets

(56) References Cited

U.S. PATENT DOCUMENTS

| | | | |
|---|---|---|---|
| 6,332,125 B1* | 12/2001 | Callen et al. | 705/4 |
| 7,177,828 B1* | 2/2007 | Land | G06Q 20/102 |
| | | | 705/30 |
| 7,194,426 B1* | 3/2007 | Box | G06Q 20/02 |
| | | | 705/26.1 |
| 7,236,952 B1* | 6/2007 | D'Zmura David Andrew | 705/36 R |
| 8,024,213 B1* | 9/2011 | Fano | G06Q 30/0201 |
| | | | 705/1.1 |
| 2001/0032091 A1* | 10/2001 | Schultz et al. | 705/1 |
| 2002/0013717 A1* | 1/2002 | Ando et al. | 705/4 |
| 2002/0103679 A1* | 8/2002 | Burkhalter et al. | 705/4 |
| 2002/0169715 A1* | 11/2002 | Ruth et al. | 705/40 |
| 2003/0009358 A1* | 1/2003 | Greenfeld | G06Q 40/02 |
| | | | 705/4 |
| 2003/0018558 A1* | 1/2003 | Heffner | G06Q 40/02 |
| | | | 705/37 |
| 2003/0167220 A1* | 9/2003 | Schoen et al. | 705/36 |
| 2005/0125259 A1* | 6/2005 | Annappindi | 705/4 |

OTHER PUBLICATIONS

Gardner et al: "College and University Programs in 'Risk Management'", Financial Practice & Education, Fall/Winter 1996, vol. 6 Issue 2, p. 68-77, Financial Management Association, College of Business Administration, University of South Florida, Tampa Florida.*

* cited by examiner

SYSTEM AND METHOD FOR ASSET ACCUMULATION AND RISK MANAGEMENT

This application is a continuation of non-provisional application Ser. No. 10/041,752, filed Jan. 7, 2002, entitled System and Method for Asset Accumulation and Risk Management, which claims benefit of provisional application Ser. No. 60/260,178, filed Jan. 5, 2001, entitled "Method and System of Asset Accumulation and Risk Management," all of which are hereby incorporated herein by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates generally to systems and methods for asset accumulation that combines income insurance and a savings investment.

The failure of the United States' banking system was the catalyst for the Great Depression. Because banks inappropriately invested the deposits of small investors in high-risk corporate loans and securities, deposits were lost when these investments defaulted. The failure of a large number of banks, and in some respects the financial markets in general, resulted in millions of consumers loosing their life savings simultaneously with a period of high unemployment.

To counter these risks, Congress enacted laws to reinstate consumer confidence in the banking system. This led to the creation of the Federal Deposit Insurance Corporation (FDIC). The FDIC guaranteed bank deposits against loss for any reason, up to a predetermined amount. This institutional safety net relieved consumers from the responsibility to evaluate the risks involved with depositing assets with one financial institution as opposed to another. At the same time, Congress enacted barriers between banks and non-bank securities providers. The main purpose of this separation was to isolate banks as a safe place to store and save money, as opposed to ownership of corporate securities that fluctuate in value over time based on market performance. In the realm of securities, investors are required to evaluate the risk of loss versus the potential rate of return on an investment.

In the United States, household wealth is positively correlated to education, occupation, age and gender. Using wealth as the key variable, it is possible to group US households into three homogeneous savings groups. The first group comprises the top twenty percent that own more than eighty percent of the total financial assets. The second group consists of the middle forty to fifty percent of households that own roughly fifteen percent of total assets and over seventy percent of the total outstanding debt. The bottom thirty to forty percent of household own less than five percent of total assets and earn less than $25,000 in annual income. This simple segmentation of US household across wealth reveals a significant asset disparity between the top twenty percent and bottom eighty percent of households.

Although not intentional, government regulations may reinforce this market segmentation. According to SEC rules, investment providers must comply with minimum professional standards, fully disclose product risks, and comply with a code of fiduciary ethics. Commissioned sales professional must collect information from customers regarding their financial goals and capacity, which is used to determine the suitability of an investment for a particular consumer. The sales agent's fiduciary duty requires a sale to be rejected where it contains unacceptable risk for the consumer. Compliance with SEC disclosure rules, suitability, and other criteria creates high fixed costs for investment providers when compared to bank savings products that are FDIC insured. Although banking restrictions have been modernized in recent years, this has not affected the boundaries between FDIC and non-FDIC investment products.

Employer defined contribution plans offer new opportunities to workers by providing a self-directed alternative to equity investment ownership. Defined contribution plans, e.g., 401(k) are retirement savings plans offered mainly by large employers as a retirement savings benefit. Workers make pre-tax contributions, which are automatically deducted from their paychecks, and employers have the option to make matching contributions based on a special formula. Employee participation has increased to about thirty million workers and has become a major source of investment for working households.

Defined contribution plans, however, are confining to the consumer because they depend on an employer/employee relationship and are limited to retirement oriented investment products due to withdrawal limitations before a certain age is achieved. Furthermore, these plans are offered to employees through their employer, but managed by outside investment providers. As a result, employees do not have a direct relationship with the investment provider. This causes employers and providers to limit their communication with employees because of the serious fiduciary liability related to the management of employees' retirement assets.

The traditional model of wealth segmentation has had a negative impact on middle class consumers because of the embedded economic incentives that cause providers to avoid consumers with fewer assets to invest. For example, investment providers tend to provide investment disincentives to low income groups through marketing and sales practices, minimum balance requirements, restring access to funds, commission prices, penalties, etc. Despite the perception that small investors are a growing force in the investment markets, their participation in terms of dollars invested is small. Also, increased levels of indebtedness that has reduced their total net worth have offset much, if not all of this value. Indeed, in the last ten years, approximately ninety percent of equity asset appreciation has accrued to the top twenty percent of US households.

Depending on their personal situation, middle class consumers do not have the means to control the risks of the modern economic environment. Turning to FIG. 1, two graphs are presented that illustrate the changing risks faced by the middle class consumer vis-à-vis income and savings potential. According to the "old economy" economic model 102, as a person ages their value of their total expenses 104 rises to a particular point and begin to decrease in the later years of life. Accordingly, income 106 also increases with age to a point and begins to decrease in later years as a person enters retirement. As is shown in the figure, a person has less opportunity to save earlier in life 108, as expenses typically outstrip income. As an individual's lifetime increases, however, expenses taper off as income continues to increase, thereby providing an opportunity to save 110.

In the new economy 112, typically defined by job insecurity, the value of an individual's total expenses 114 rises to a particular point and then begins to decrease in the later years of life. Unlike in old economy 102, however, job security is tenuous at best with individuals frequently changing employers and income levels 116. Hallmarks of the new economy include lower workplace stability, high risk of involuntary job displacement, lower chance of re-employment with comparable pay, high healthcare costs, and lower employer benefits. Because income is constantly in a state of flux, there is less of an opportunity to save. Indeed, the opportunity to save may present itself and be eliminated before the employee even realizes it. This creates a need for new forms of precautionary income in order to account for these new patterns of behavior.

Because middle class consumers are vulnerable to new and increased risks to their economic well being, present wealth segmentation models are no longer sustainable. Concurrently, employers have transferred risks back to workers, thereby making them fully responsible for their individual financial security. As indicated above, middle class must overcome barriers to participating in the growth of the economy because they pose disadvantages to traditional investment providers. An aging population and deterioration in the value or coverage of employer benefits exacerbate these problems.

There is thus a need for a system and method that allows consumers to safely manage risk, accumulate liquidity, and obtain additional income security protection.

BRIEF SUMMARY OF THE INVENTION

The invention comprises a system and method that allows a consumer to manage risk and accumulate assets. Advantageously, the system and method of the present invention may be implemented in whole or in part on a computer or multiple computers in communication over a data network. The method of the present invention involves predicting and prioritizing consumers and consumer risks, behavior, and unmet need for a risk management solution. Eligibility of consumers is determined by receiving and analyzing information from and about the consumer in addition to publicly available data regarding the demographic group to which the consumer belongs. This information includes, but is not limited to, income level, age and occupation, education, risk tolerance or intolerance, and spending and savings habits. These data are used to determine a consumer's need and suitability for the risk management program of the present invention.

If a person is deemed eligible, the method further involves establishing an ongoing and customized risk management program for the consumer that can be dynamically adjusted to his or her needs and risk tolerance. Once a consumer meets eligibility criteria and is enrolled in the program, a certain amount of the consumer's income or financial assets is periodically charged, e.g., monthly or yearly, based on pre-authorized instructions by the consumer. A portion of the assets are allocated to cover the premium for a defined insurance income benefit that pays for eligible major living expenses when the consumer's job is involuntarily discontinued. This benefit is available so long as the consumer participates in the program.

All or part of the remainder is direct to a defined contribution vehicle, such as a savings or investment product that invests in the stock market and savings insurance. The vehicle can be a qualified retirement vehicle that has tax advantages, such as an IRA or a non-qualified benefit. According to one embodiment, the savings contribution is protected against principal loss so long as the consumer participates in the program. Consumers are permitted access to savings and may make withdrawals, subject to the prevailing market value of their assets where the assets are a variable return security, e.g., stock.

In accordance with some embodiments of the invention, the portion of assets allocated to cover the unemployment insurance premium is determined based upon the information received from the consumer, as well as stored tables relating statistical risk of unemployment based on occupation, age, industry and geography. The method of the present invention may also take into account actual behavior and claim experience of the consumer over time. The premium amounts, covered expenses, and savings contributions are adjustable to enable consumers to calibrate the method of the invention based on his or her changing needs.

According to other embodiments, the present invention is continually adjusted and/or augmented in response to the shifting risks and behaviors of existing and future consumers. Based on continued monitoring of behavior, consumers are rewarded for good savings and claim behavior with economic incentives such as a lower insurance premium or other financial benefits and services. Program results and consumer participation is measured according to an established metric for good behavior. The present invention is a self-directed portable benefit plan and delivery system that empowers consumer's to manage the new risks and uncertainty associated with the new economy of the $21^{st}$ century.

The present invention is also directed to a computer-implemented method for accumulating assets and managing risk for a consumer. The method comprises prioritizing and segmenting the consumer according to risk and behavior. The need and suitability for a customized risk management program based on the risk and behavior of a user is determined and the customized risk management program is established based on the prioritization where it is determined there is the need for the customized risk management program.

The invention may further comprise a computer-implemented method for managing an integrated financial product designed to manage a consumer's unemployment risk and promote good savings behavior. The method comprises receiving funds from a customer to fund the financial product. A first portion of the funds is allocated to a defined unemployment insurance vehicle based at least in part on employment data. A second portion of the funds is allocated to a defined savings contribution vehicle. The allocation between the first portion and the second portion is dynamically adjusted in response at least in part to one or more changes in the employment data.

The invention may be embodied as a computer-implemented method for managing an integrated financial product designed to manage a consumer's unemployment risk and promote good savings behavior. The method comprises receiving funds from a customer to fund the financial product. A first portion of the funds is allocated to a defined unemployment insurance vehicle based at least in part on employment data and a second portion of the funds is allocated to a defined savings contribution vehicle. The consumer is rewarded by changing terms of the integrated financial product in reaction to the consumer maintaining healthy financial practices.

BRIEF DESCRIPTION OF THE DRAWINGS

The invention is illustrated in the figures of the accompanying drawings which are meant to be exemplary and not limiting, in which like references are intended to refer to like or corresponding parts, and in which.

APPENDICES

The following appendices appear at the end of the specification and form part thereof:

Appendix A presents a table comprising exemplary consumer household risk identification information for use with embodiments of the present invention;

Appendix B presents a table comprising exemplary risk rating calculations according to one embodiment of the present invention; and Appendix C presents several columns of data illustrating projected savings for a consumer with and without the present invention.

DETAILED DESCRIPTION OF THE PREFERRED EMBODIMENTS

Figure 1:
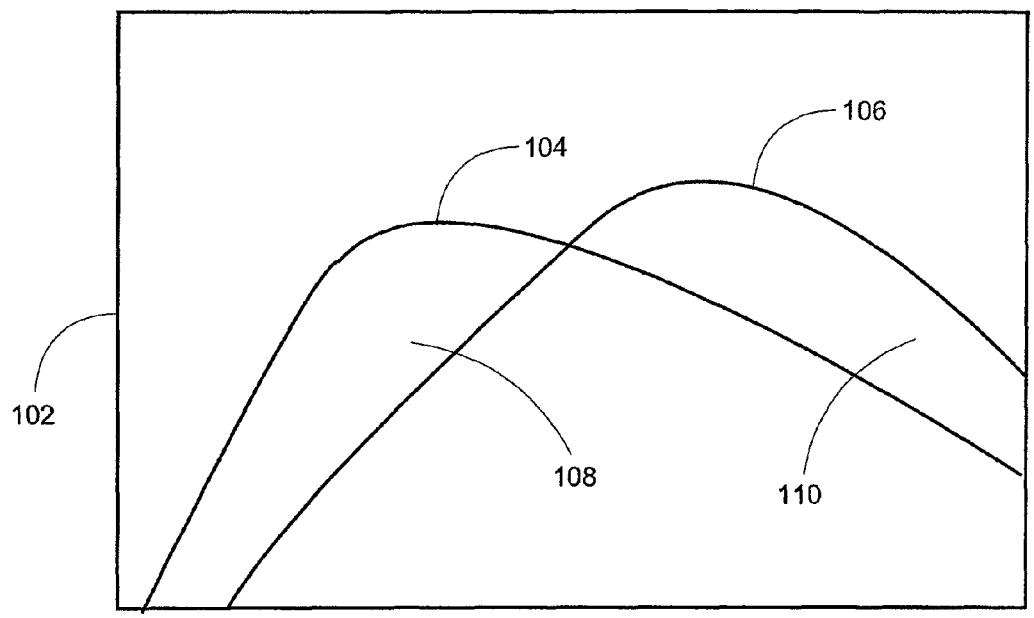
FIG. 1 presents two graphs that illustrate the changing risks faced by the middle class consumer vis-à-vis income and savings potential.
Figure 1:
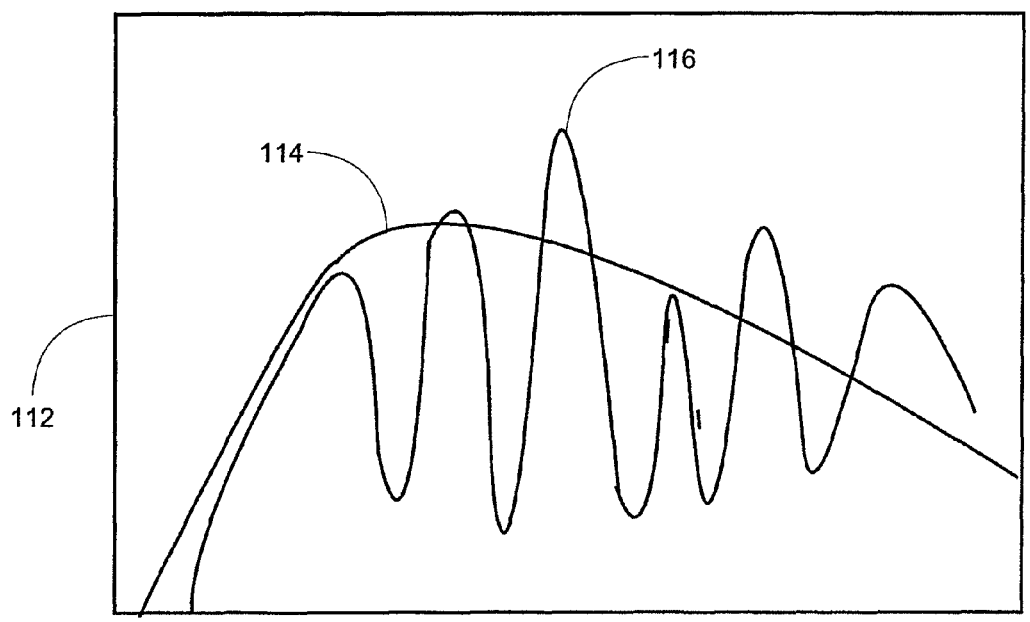
Figure 2:
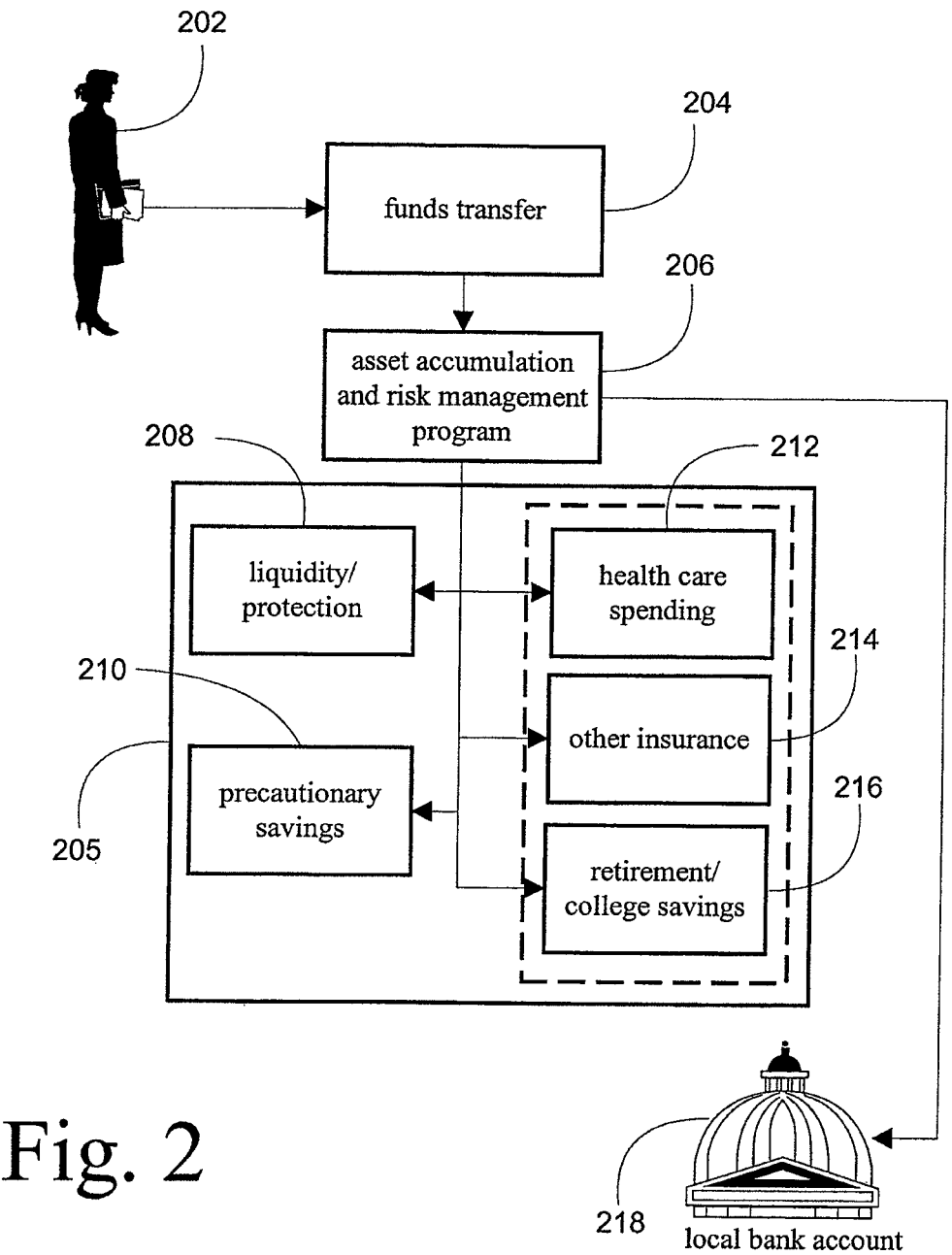
FIG. 2 is a block diagram presenting a system for the distribution of funds according to one embodiment of the present invention.

With reference to FIGS. 2 though 9, embodiments of the invention are presented. Turning to FIG. 2, a consumer 202 is presented who possesses an unmet need for a risk management and asset accumulation. In order to allocate funds to meet these unmet needs, the consumer 202 transfers funds to the participating institution. The process of funds transfer 204 is preferably effected through electronic funds transfer, as is well known to those skilled in the art. Electronic funds transfer 204 may be executed by a consumer 204 through use of an Automated Teller Machine (ATM) or using electronic funds transfer software loaded on a consumer's personal computer (not pictured). Alternatively, a consumer 204 may execute the funds transfer 204 by mailing a check or money order to the participating institution to fund the system for asset accumulation and risk management.

The participating institution 205 receives the currency from the consumer 202 and funds the consumer's account for asset accumulation and risk management. Using the currency supplied by the consumer 202, an asset allocation and risk management program 206 calculates the distribution of the received currency between liquidity/protection 208 and precautionary savings 210. According to embodiments of the invention, the liquidity/protection account 208 is an unemployment insurance account that may be used to provide liquid assets to the user in the event of involuntary unemployment. Also, the precautionary saving account 210 may be a passbook savings account, shares in a mutual fund, stock or other assets that may be quickly and easily converted to cash, although other financial instruments such as Certificates of Deposit may be utilized by the invention.

In accordance with the invention, the asset accumulation and risk management program 206 maintains the liquidity protection vehicle 208 and precautionary savings vehicle 210 as a single, integrated financial product or account. This allows, among other things, for a single monthly funds transfer to the account and allocation between insurance and savings vehicles and for issuance of a single periodic account statement. This also allows for dynamic adjustments between insurance and savings allocations based on, as explained further herein, changes in data regarding the participating consumer's employment, including changes in jobs or changes in employment statistics for the consumer's job. This further supports providing rewards to a consumer who participates consistently and properly in the program through, for example, reduced employment or savings insurance premiums or higher interest rates or other rates of return on the savings vehicle 210.

The participating institution 205 may further offer an expanded set of savings and risk management services to a consumer 202 outside liquidity protection 208 and precautionary savings 210. Accordingly, the participating institution 205 may offer other saving and risk management accounts including health care spending accounts 212, retirement and college savings accounts 216, and other types of insurance 214. These accounts may be funded using financial instruments, such as those described above. Alternatively, other types of longer term savings instruments may also be utilized by the invention, such as U.S. government savings bonds, that mature over a period of years, but may easily be converted to cash. These additional services may form part of the integrated financial product managed by the asset accumulation and risk management program 206, thus resulting in the additional benefits described herein.

Using the asset allocation and risk management program 206, the consumer may satisfy the unmet need for liquidity protection and precautionary savings. Once the consumer places aside currency for employment risk management 208 and precautionary savings 210, the balance of the consumer's funds are transferred to the consumer's local bank account 218. For example, where the consumer 202 is paid on a weekly basis, the participating institution 205 deducts the required amount or amounts through funds transfer 204, with the balance being deposited in the consumer's local bank account 218. The funds deposited in the local bank account 218 are available to the consumer 202 for discretionary spending.

Figure 3:
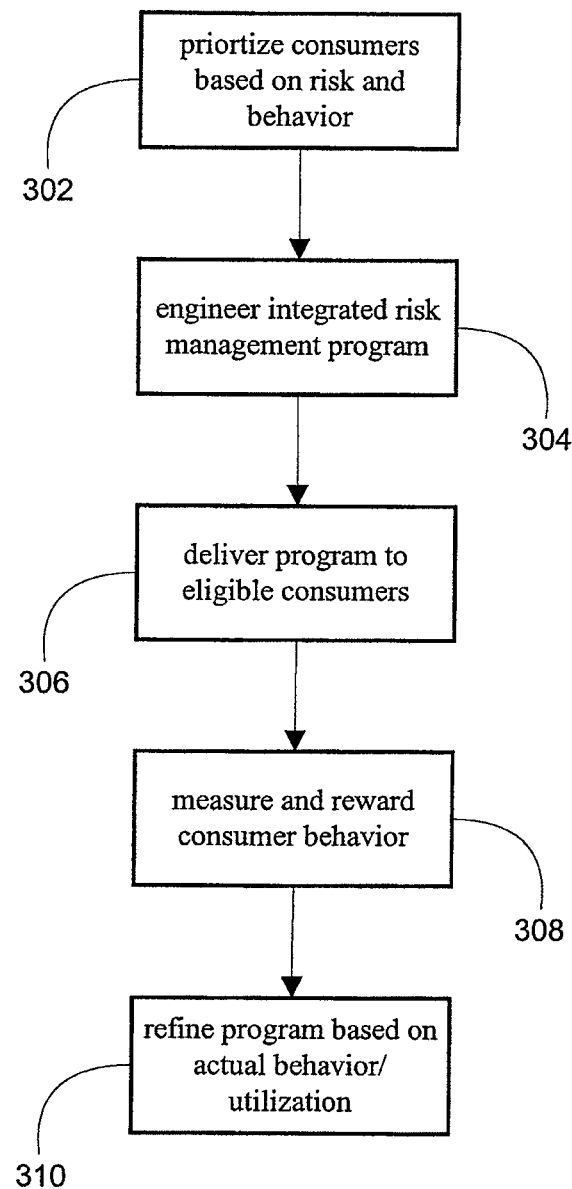
FIG. 3 is a flow diagram presenting a high level process for asset accumulation and risk management according to one embodiment of the present invention.

The participating institution 205 uses the asset allocation and risk management program 206 in order to meet the demand for liquidity protection and precautionary savings. In order to meet these needs, the program 206 executes the process presented in FIG. 3. The program predicts and prioritizes consumers and consumer risks, behavior and unmet need for a risk management solution, step 302. This includes determining the eligibility of a consumer by receiving and analyzing data regarding the individual in conjunction with publicly available group data. Individual information collected in order to execute this process includes, but is not limited to, income level, age and occupation, education, risk intolerance, spending and savings habits. The system also determines whether the consumer needs and is suitable for the risk management program based on this information.

Where the consumer is deemed eligible, an ongoing and customized risk management program is engineered for the customer, step 304. At a minimum, the customized risk management program comprises a defined insurance income benefit and defined contribution vehicle. This insured income benefit may comprise paying for eligible major living expenses when the customer's job is involuntarily discontinued, e.g., the consumer is laid off. The defined contribution vehicle may be one of any number of savings investment vehicles, such as a savings account, mutual fund shares, or shares of stock, which may also be a tax advantaged qualified retirement vehicle. According to one embodiment of the invention, the consumer's savings contribution is protected against principal loss when the consumer participates in the program for a determined period of time. Before this time, however, consumers are permitted access to the savings and may make withdrawals subject to the prevailing market value of their savings assets.

The engineered program must be delivered to end users, e.g., consumers, who enroll in order to satisfy unmet risk management needs, step 306. As is explained in greater detail herein, the participating institution creates awareness of the program among high potential groups, e.g., those consumers with a high need for risk management and asset allocation. Consumers who respond to the awareness generated by the participating institution are screened to obtain personal and financial information. Based on this screening, an eligibility determination is made. Eligible consumers who opt to participate in the program begin by starting their regular contributions to the program. As the consumer participates in the program, functionality is provided to monitor and continue to collect consumer information in addition to resolving consumer problems with the system, e.g., technical support.

The program continues to monitor and measure the consumer's actions and use of the program, step 308. Where the use maintains healthy financial practices, the system rewards the consumer. For example, where the consumer's savings exceed a particular benchmark, where the consumer makes the necessary finds transfer for n consecutive months, or where the user files insurance claims costing less than the benchmark cost of insurance claims, the consumer is rewarded. An exemplary reward would be an increased interest rate on the consumer's savings account held by the consumer. Alternatively, the user may be entitled to lower unemployment or savings insurance premiums, thereby freeing more funds for either savings or discretionary spending. Furthermore, the reward structure may be based according to the risk segment to which the consumer belongs.

In simple terms, this creates a virtuous system of incentives designed to reinforce the good behavior of consumers by providers. For example, as a consumer participates through use of the system, behavior is collected, stored and statistically analyzed. As explained in greater detail herein, segmentation of the consumer space makes it possible to identify well behaved consumers in relation to the segment in which they are located and the complete universe of all consumers. Once individuals are segmented and prioritized, extraordinary consumers may be identified through the use of equations and methods presented herein. The fundamental concept, however, is to stimulate and reinforce the specific behavior that creates value and reduces risk for consumers.

The program is also refined based on the actual behavior of the consumer and his or her utilization of the system, step 310. The present invention provides functionality to monitor user behavior and modify the ranking assigned to the user based on the observed behavior. For example, certain consumer segments may demonstrate a low rate of purchase interest. This information may be fed back into the predictive model (presented herein) to improve the efficiency of the distribution of the services of the system to prospective consumers. Alternatively, certain consumer segments may demonstrate low rates of savings behavior and/or extraordinarily high claim rates, such as with regard to the defined insurance income benefit. This information may be used to improve consumer behavior and/or decrease the priority of such segments. In all cases, the methods used to uncover unstated consumer need and behavior is not apparent with regard to the models used by traditional investment providers.

Figure 4:
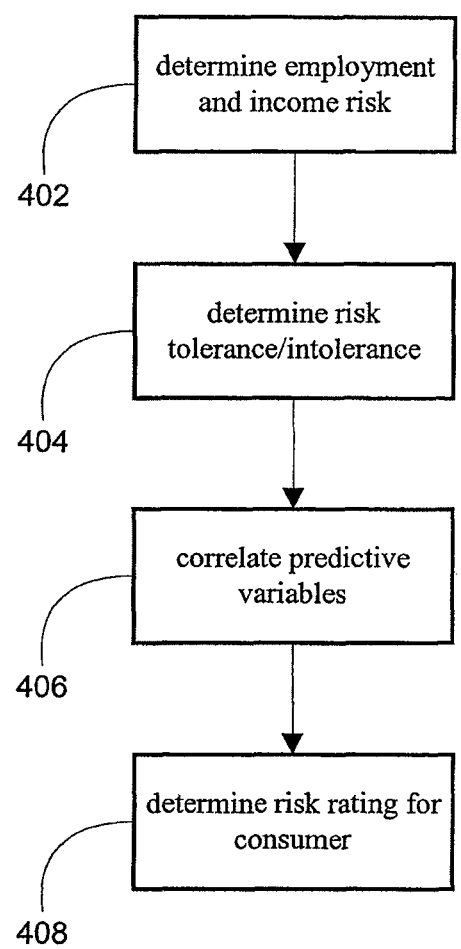
FIG. 4 is a flow diagram presenting a process for prioritizing consumers based on risk and behavior according to one embodiment of the present invention.

The process of prioritizing consumers based on a risk profile, step 302, to thereby satisfy probable unmet need for the invention is explored in greater detail in FIG. 4. The process of predicting and calculating consumer risk and behavior is based on key segmentation variables. The consumer's risk of involuntarily losing employment and income is determined, step 402. There is a positive linear relationship between consumer insecurity and employment risk, even though the consumer's perception may be disproportionate to the actual probability of risk. In reality, job displacement and creation are a function of 1) structural and/or cyclical changes in national and/or regional economies and 2) the consumer's skill set vis-à-vis employer demand. The level of consumer insecurity, therefore, may be measured at any point in time or over any interval of time by application of the equation presented in Table 1.

TABLE 1

Employment risk = probability of unemployment × average duration of unemployment × (average amount of income/benefits + average permanent loss of income/benefits)

The initial data set used to evaluate the equation of Table 1 may be extracted from one or more government data sources that statistically track economic and labor force trends on an ongoing basis. For example, the US Bureau of Labor Statistics, state and federal unemployment insurance databases, US Census population surveys and various other sources contain the requisite information necessary to measure employment risk and economic volatility.

The other variable that determines the consumer's risk management problem is the financial ability to tolerate risk. Risk may be a function of continued and unexpected income fluctuations, inflation risk, market risk, or investment losses. The consumer's risk tolerance or intolerance is therefore determined, step 404. Consumer risk tolerance or intolerance is generally defined as the real or perceived capacity to absorb uncertain financial shocks and maintain their normal level of living expenditures. More specifically, risk tolerance or intolerance may be defined as marketable wealth that can be converted into liquid assets and used for consumption.

Middle class consumer households have a significantly lower and decreasing ability to tolerate financial risk when compared with affluent households. At the same time, they have a reduced capacity to save and accumulate assets because there has been a general deterioration in income, e.g., paychecks. This situation perpetuates more risk for consumers, both in terms of long-term retirement income adequacy and short-term liquidity needs. Because consumer's are more constrained, they are less likely to save and less likely to invest in variable risk assets.

In terms of identifying and measuring the relative intolerance of consumers, government data shows a linear correlation between consumer spending/borrowing behavior and decreased tolerance for financial risk. This relationship is particularly strong among heavy users of consumer debt. Logically, consumer dependence on debt for short-term liquidity reduces a consumer's ability to tolerate risk. As the level of debt maintained by the consumer increases, it also reduces the consumers' after-tax disposable income by the amount of the minimum monthly payments owed.

From the foregoing analysis, a consumer's risk tolerance can be measured based on homogeneous and identifiable characteristics that distinguish them from the rest of the population. Using Federal Reserve data and statistical methods such as discriminate, correlation, and/or other analytical methods, these consumers can be identified and ranked on the basis of these special characteristics. The data contained in Appendix A provides one example of how consumers can be identified and separated into multiple segments based on their probability of risk tolerance. For example, the group of consumers with the highest average unemployment rate may be grouped together and classified as a high-risk group of consumers. The consumers that fall within this segment include farmers, forest workers, fisherman, and assemblers.

Based upon the determined employment/income risk and risk tolerance/intolerance for a consumer, these predictive variables are correlated, step 406. The intersection of employment volatility and risk intolerance predicts the consumer's total risk profile, risk management needs, and behavior at any selected point in time. The intersection of these two variables, therefore, is a useful predictor of the consumer's unmet need for risk management and asset accumulation. This correlation is achieved through the iterative manipulation and cross-referencing of the relevant government databases using one or more statistical analyses, such as discriminate, regression, or other statistical approaches. The equation of Table 2 presents one method of correlating risk and risk tolerance.

TABLE 2

Risk management problem = employment risk × probability of risk tolerance

Figure 5:
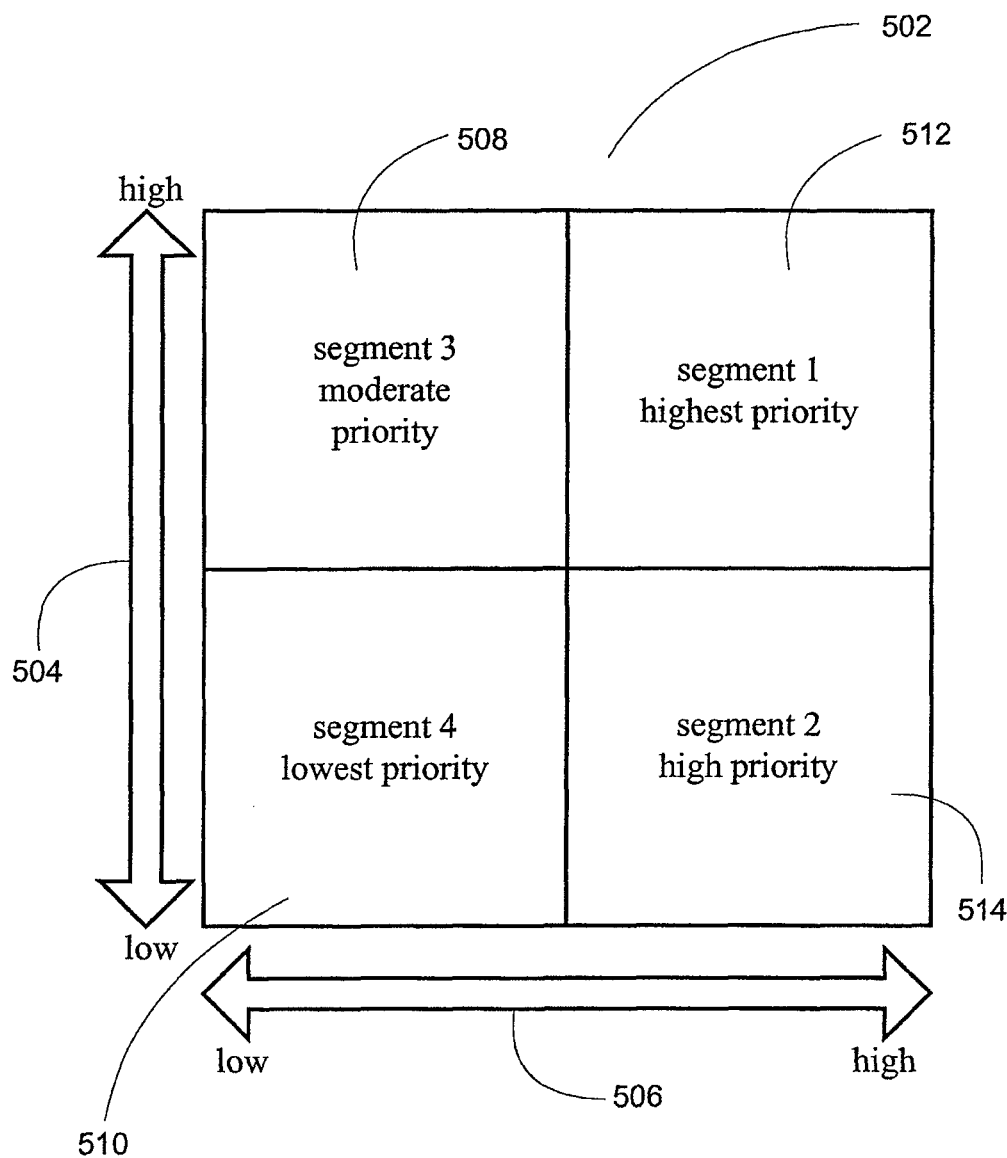
FIG. 5 is a graph presenting the distribution of priorities as risk tolerance versus employment risk according to one embodiment of the present invention.

Once this data is synchronized, it may be used to populate a computerized database that defines a central knowledge system used to rank consumers. Furthermore, the model is dynamic whereby the system captures the necessary data to measure changes in the level of individual and/or group risk as they take place and make improvements to the method executed by the system of the present invention Turning to of FIG. 5, the prioritization of consumers according to one embodiment of the present invention is presented, e.g., the correlation described in step 406 of FIG. 4. The graph presented 502 demonstrates the "bipolar" nature of prioritization in relation to established investment providers in that it places a priority of middle class risks and problems. According to the graph, the X-axis 504 is a measure of a consumer's risk of involuntary loss of employment whereby values increase as one moves away from the origin. Similarly, the Y-axis 506, which is a measure a consumer's level of risk intolerance, comprises values that increase as one moves away from the origin. Using these definitions for the x and y-axes, 504 and 506 respectively, the total population may be segmented according to priority.

The first segment 512 identifies those consumers with the greatest need for assistance in accumulating assets and managing risk. These consumers have the highest risks of employment loss and/or significant fluctuations in their incomes. Concurrently, these consumers have extremely high intolerance for income stress. These consumers can be described as high-risk dissavers. They include both blue and white collar workers and middle class workers. The second priority group 514 consists of consumers with a moderate-low risk of employment loss. This group 514, however, like members of the first segment 512, is composed of dissavers and is therefore highly intolerant to any income risk. Segment two 514 primarily consists of consumers that may also find themselves grouped in the first segment 512.

The third segment 508 consists of consumers that are tolerant to income risk but have a high risk of involuntary unemployment. This group 508 may also be described as those consumers with a high risk of unemployment but maintain an adequate level of savings to assist in weathering periods of unemployment. The third segment 508 of consumers primarily consists of white collar workers, emerging affluent, and the self-employed. The fourth and final segment 510 have a low risk of involuntary unemployment and are at the same time highly resistant to household stress. They may alternatively be described as savers and investors. Furthermore, this is the segment that traditional investment providers target.

Returning to FIG. 4, the risk rating is determined for a particular consumer, step 406. Based on the predictive equation and segmentation of the consumer space, each consumer may be assigned a value or score that describes their risk profile and behavior compared to other consumers in the population. This profiling methodology has multiple applications including, but not limited to, pre-selecting consumers for access to the system, measuring a consumer's risk, qualifying consumers for eligibility, and measuring changes in consumer behavior and risks over time. Appendix B presents an exemplary set of consumer risk ratings based on occupation assuming hypothetical consumers and risk profiles. Importantly, this rating model is diametrically opposed to the methods used by banks and credit providers. According to some embodiments, the invention implicitly places a higher value on the consumers that would theoretically be of less value to credit providers.

Figure 6:
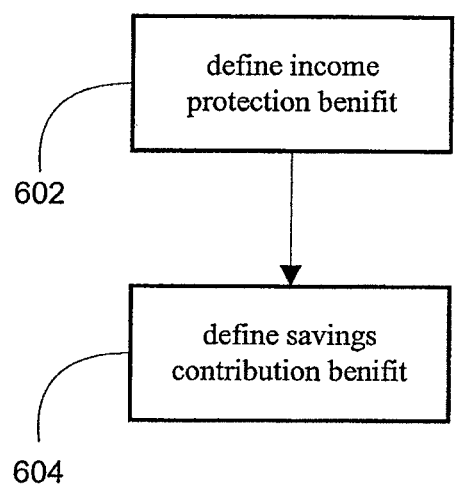
FIG. 6 is a flow diagram presenting a process for engineering an integrated risk management program according to one embodiment of the present invention.

Consumers are segmented and prioritized according to risk and a risk management program is engineered as presented in FIG. 6. Subject to legal and regulatory approval, several permutations are possible. One preferred embodiment comprises two components integrated into one benefit structure and customized to the specific needs of eligible consumers. The program is designed specifically to empower consumers with non-traditional means of self-insured liquidity, income protection, and systematic asset accumulation. Traditional investment providers do not address this combination of benefits. Accordingly, the program combines an income insurance benefit with a savings and asset accumulation benefit that are linked to eligibility criteria and end user behavior.

The program of the present invention comprises defining an income protection benefit, step 602. This benefit provides eligible consumers with a specified cash benefit in the event of involuntary job displacement. According to one embodiment, eligibility is unconditionally linked to active participation in a certain defined contribution saving plan connected to the insurance benefit. The cash insurance benefit, step 602, is calculated as a function of a consumer's eligible living expenses, such as mortgage, rent, healthcare insurance costs, and any required monthly contribution to the saving portion of the plan. Alternatively, the consumer may designate those expenses that are to be covered by the insurance, and may periodically adjust the amount of income protection they receive. In some embodiments, a cash payment is made directly to the beneficiary.

The insurance benefit is designed by applying certain assumptions and standard principles for property and casualty insurance. First, the expected claim cost must be derived, which should be equal to the average rate of involuntary job displacement times the average dollar amount of the benefit. The product of this calculation is multiplied by the average duration of the claim with the total insured universe. Based on the expected claim cost, the required premium can be calculated by adding the amount of expected losses due to participant claims with other delivery expenses including sales, administration and the desired amount of profit per insured. Table 3 presents an equation that summarizes this discussion.

TABLE 3

Claim cost = frequency × benefit amount × duration of benefit + expenses + profit There is no relevant historical experience to forecast future claims and losses of the income insurance benefit because it currently does not exist. For this reason, one embodiment of the present invention contemplates utilizing actuarial loss experience of an existing credit life involuntary unemployment insurance products as a benchmark for modeling purposes. This product is widely sold and guarantees minimum monthly payment or portion of a loan balance in the event of involuntary job loss. This loss experience coupled with actual unemployment data may be used to establish an actuarial baseline for the new product.

The insurance benefit may potentially attract high-risk end users that stand to generate extraordinary losses. In order to manage this risk, a number of strategies and combinations thereof may be employed. For example, a premium may be established based on projected losses equal to 150% of the industry standard. Alternatively, claim criteria may be tied directly to eligible consumer expenditures, employment status and other conditions. Another alternative considers including the right to adjust premiums in the event of material adverse events or unexpected economic trends and/or consumer behavior. As one skilled in the art should recognize, these and combinations of other alternatives may be used.

In addition to defining an income protection benefit, step 602, the present invention defines a savings contribution benefit, step 604. This benefit is designed to remove barriers blocking middle class savings behavior. One embodiment of the savings contribution benefit is a mutual fund that gathers and invests end-user contributions.

A certain percentage of the contribution to this portion of the program, according to one embodiment 80% of the contribution, are invested in one or more equity index mutual funds or other equity investment vehicles, such as stocks, mutual funds, or a blend of mutual funds selected at the time the consumer enrolls in the system. According to one embodiment, consumers realize a rate of return that parallels the performance of a defined group of publicly traded companies, for example, the S&P 500. Index mutual funds do not require active management outside of periodically trading assets to bring the fund into line with the index on a weighted average basis. This category of mutual funds are advantageous because of their liquidity and nominal trading activity that minimizes annual capital gains taxes. There are, of course, other equally beneficial embodiments that are apparent someone skilled in the art, such as combinations of individual stocks, mutual funds, index mutual funds, derivatives, etc.

The remaining funds, which according to one embodiment are 20% of the consumer's contribution, are used to purchase savings loss insurance from one or more providers to insure principal assets against market losses. The savings insurance may be purchased in the form of puts, options, futures securities or other contracts suitable for this purpose. According to some embodiments, this guarantee only applies to savings that stay invested in the plan for a minimum number of years. This allows participating consumers to withdraw their savings for any reason, subject to the prevailing market value of their accumulated assets including the value of the savings insurance, but without the benefit of principal protection. The amount of consumer assets used to purchase the savings insurance may fluctuate depending on prevailing market conditions such as interest rates and market volatility, which may affect the cost of purchasing savings insurance.

According to other embodiments of the invention, the amount of funds directed towards purchase of savings insurance may be adjusted upwards or downwards based on consumer preferences. In this case, the amount invested in the equity financial instrument, e.g., stock or mutual fund, would also be increased or decreased based on the amount of insurance as a percentage of the savings contribution. For example, where the consumer wishes to participate 100% in the equity investment vehicle, then the cost of savings insurance is zero.

While the employment insurance and savings investment form the primary components of the invention, consumers may be presented with access to other packaged solutions that assist them in managing new risks and responsibilities. As presented in FIG. 2, these benefits may include additional savings and investment programs, check writing and processing, electronic bill payment and cash management, debt consolidation programs, etc. Enrolled consumers also have the opportunity to connect existing economic security providers, benefits and relationships. This integration is provided through a communications medium such as the Internet or other communications architecture.

Figure 7:
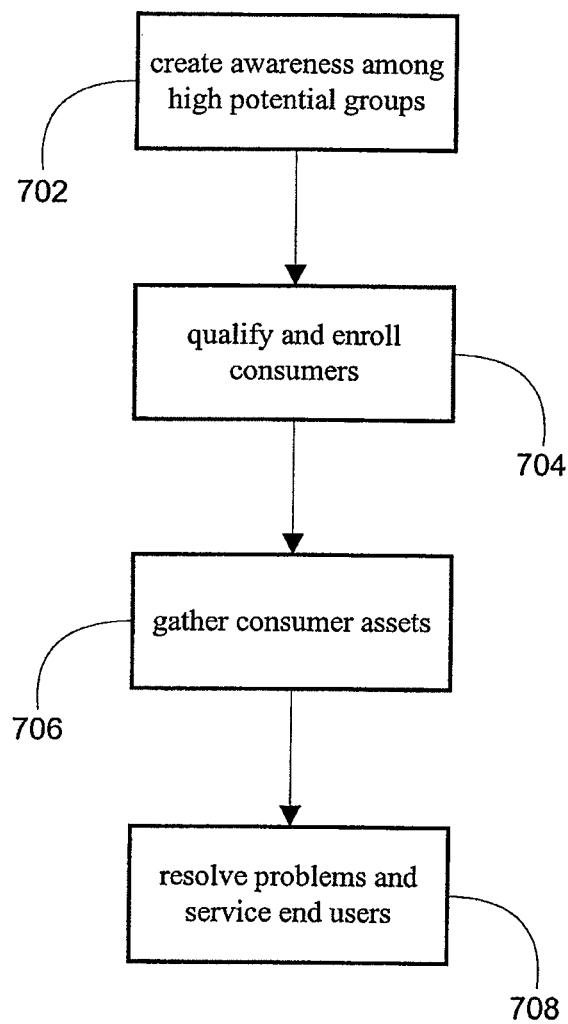
FIG. 7 is a flow diagram presenting a process for delivering program benefits to eligible end users.

Turning to FIG. 7, a flow diagram is presented illustrating one embodiment of a process for delivering the program to eligible consumers. Program delivery starts by creating awareness among high potential groups, step 702. Target consumers may be identified using the predictive model presented in FIG. 5. This requires cross-referencing potential consumer computerized databases with the predictive model. Once a high priority segment is selected, a marketing campaign is deigned and customized to the particular needs of the group of consumers. Alternatively, before the awareness campaign is initiated, the program may be test marketed with selected subgroups. Furthermore, one or more of the following mediums may be used to reach consumers to generate awareness: mass media, direct mail, Internet, ATMs, co-branding and third party alliances. Other mediums and combinations should make themselves apparent to those of skill in the art.

Respondents must be qualified and enrolled in the program of asset accumulation and risk management, step 704. This step comprises managing consumer response and separating ineligible respondents and engaging the maximum amount of qualified consumers in the program. Consumers who respond to the awareness program provide personal and financial information, preferably in a prescribed computerized format. This information includes, but is not limited to, personal identifying information, employment history and occupation, living expenses and income, spending behavior, etc. Based on this respondent information, the system determines if the consumer is eligible for the benefit program. Eligibility may be determined by, but not limited to, application of the predictive model, disqualification of consumers who do not respond in a timely manner. Collected information, step 704, may also be used to customize the benefit program in terms of price, premium benefit, investment selection, amount of savings insurance, etc.

Qualified consumers are enrolled in the program and consumer assets are gathered, step 706. One embodiment contemplates collecting consumer assets by electronic funds transfer (EFT). EFT is the movement of funds in and out of consumer accounts using electronic communications systems. The intention is to enable consumers to authorize the electronic transfer of funds into the benefit program through one or more EFT systems available to the consumer, including: point of sale ATM or debit, direct payment including direct deposit, stored value and smart cards, and home banking over the Internet.

When the consumer is enrolled and participating in the system and method of the present invention, customer information and technical support are provided, step 708. Using a communications medium such as the Internet and/or other communications architecture, personal and financial information may be updated. Alternatively, consumer information may be retrieved and modified via automated voice response. Furthermore, a computerized claims process is put in place to verify the status and eligibility of the consumer and submitted claims for the income benefit. In one preferred embodiment, this may be provided through a remote process such as a telephone-based claims process. The system may also be provided with access to other sources of security such as employer/government benefit plans, personal financial accounts and plans, and health insurance providers in order to provide consumers with a comprehensive and interactive means of managing all aspects of economic risk.

Figure 8:
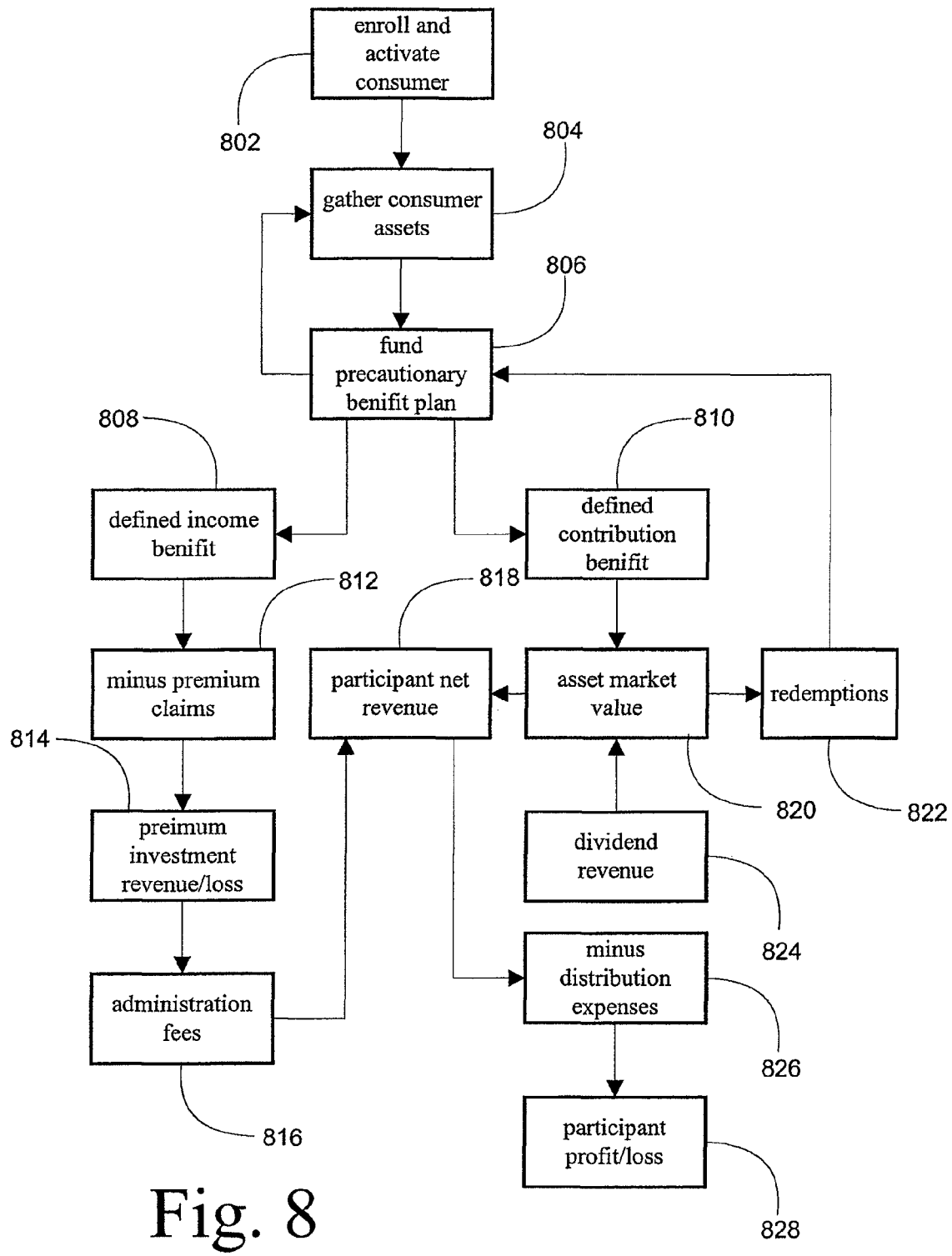
FIG. 8 is a flow diagram presenting a detailed process for asset accumulation and risk management according to one embodiment of the present invention.

A detailed embodiment unifying the processes presented in FIGS. 3 through 7 is shown in FIG. 8. The process is initiated when the consumer enrolls in the program and is activated, step 802. The process of program delivery is more fully explained by FIG. 7 and the accompanying text. Once the consumer is active in the program, step 802, consumer assets are gathered, step 804. According to one embodiment, assets are gathered through the use of electronic funds transfer, although other techniques for asset collection fall within the scope of the invention. The assets that are collected from the consumer by the participating institution, e.g., the financial institution offering the program, are used to fund a precautionary benefit plan for the consumer, step 806.

According to this embodiment of the invention, the benefit plan, a single, integrated program and account, is bifurcated into a defined income benefit, step 808, and a defined contribution benefit, step 810. The defined income benefit is an insurance premium payment, step 808, comprising an insurance benefit tied to the risk of involuntary unemployment. According to embodiments, the benefit covers essential expenses of mortgage, rent and health care insurance. The premium may be defined by the consumer's occupational profile, employment history and savings contributions. The premium paid by the consumer is reduced by the value of any claims submitted, step 812. Where the premium is invested, the value is adjusted up or down depending on whether there is an investment gain or loss, step 814. The premium amount is further diminished by the cost of any administration fees incurred by the participating institution, step 816. This final value is passed to the participating institution and form part of the net revenue, 818.

The defined contribution benefit, step 810, is a contribution made for the purchase of an investment asset, such as an index mutual fund tied to a major equity index, e.g., the S&P 500. The market value of the consumer's accumulated assets is available to the participating institution, which may leverage it as float. This also forms a part of the participating institution's net revenue, step 818. The market value of the consumer's accumulated assets may be reduced at any time through redemptions made by the consumer, step 822. For example, when the consumer needs cash, assets may be liquidated. Furthermore, dividend revenue is periodically disbursed, step 824, and increases the market value of the assets, step 820.

The participating institution's net revenue, step 818, is comprised of funds derived from the defined income benefit, step 808, as well as the defined contribution benefit, step 810. Expenses, however, may be incurred by the participant when liquidating assets or performing other distributions, step 826. The participant net revenue, step 818, minus the distribution expenses, step 826, results in the final participant profit/loss, step 828, thereby concluding the process.

Figure 9:
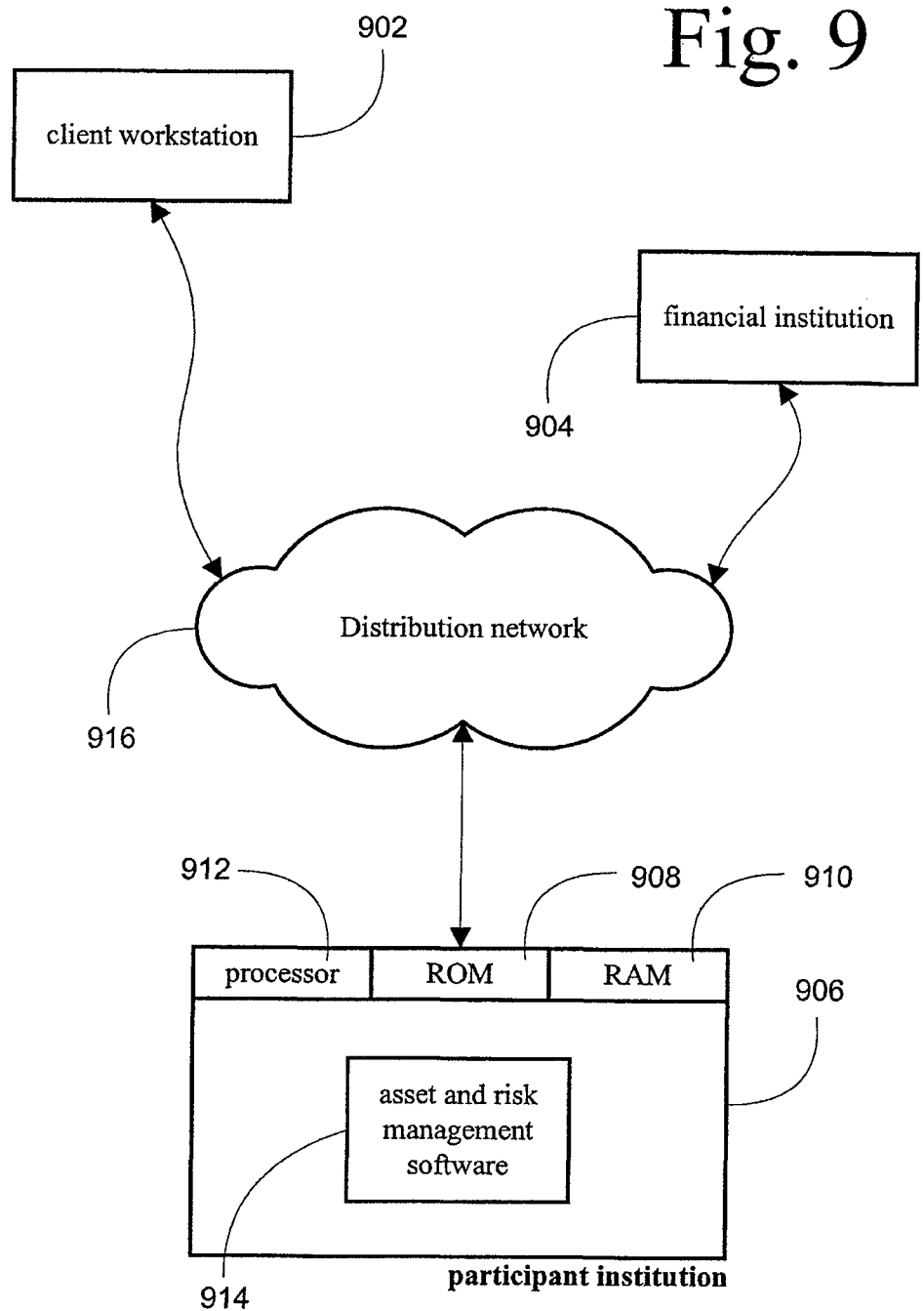
FIG. 9 is a block diagram presenting an arrangement of hardware and software components for asset accumulation and risk management according to one embodiment of the present invention.

One embodiment of a system for executing the processes presented in FIGS. 3 through 8 is presented in the block diagram of FIG. 9. Using a client workstation 902 a consumer interacts with his or her financial institution 904 in order to transfer funds to the participant institution 906. The client workstations may comprise one of any number of digital computing devices including, but not limited to, personal computers, set top terminals, and personal digital assistants.

Communication between the computing devices occurs over a network 916 capable of transporting data traffic, such as the Internet. According to this embodiment, all processes presented in the aforementioned figures are conducted between the client 902, financial institution 904, and participant institution 906, are conducted over one or more computer networks 916.

The participant institution 906 comprises a server or other similar computing device. This is preferably a class of computer capable of conducting a plurality of simultaneous sessions with different consumers 902 and financial institutions 904. The participant sever 906, comprises a programmable digital microprocessor 912 used to execute program code stored on computer readable media (not pictured). The server further comprises read only memory 908 (ROM) containing a set of instructions, typically used by the server when it is initially booted up, and random access memory 910 (RAM) used by the microprocessor 912 as transient storage space.

The participant server 906 also comprises asset and risk management software 914. The software 914 is preferably stored on computer readable media so as to be read by the microprocessor 912. By executing the program code of the asset and risk management software 914, the microprocessor is capable of performing the process of asset allocation and risk management as presented in the previous figures.

To further the understanding of the financial product presented herein, it is useful to provide examples of illustrations of a consumer's projected financial position after a period of time with and without the financial product. These illustrations, presented in Appendix C, may be generated through use of an illustration component of the asset accumulation and risk management program as described herein. The data for four consumers is presented in Appendix C, Consumer One through Four. The first scenario presented in Appendix C, Consumer One, is split between the consumer investing through use of the invention (left column) and performing traditional investing (right column). In both scenarios (columns), the consumer makes a $180.00 monthly contribution. When employing the invention, $30.00 of the consumer's monthly contribution is allocated towards payment of fees for insurance, e.g., savings and unemployment insurance, with the remaining $150.00 funding a savings investment.

At the conclusion of the sample 72-month period, the consumer's total savings through utilization of the invention with a 13% return tied to the S&P 500 is $15,078, less $2,160 in fees. Comparatively, where the user simply makes direct investment in a financial product offering a 13% return, their total savings at the close of the sample is $19,219.00. While gross savings are lower in this example when utilizing the invention, the consumer receives an intangible benefit from the unemployment insurance premium paid as part of the $30.00 monthly fee. According to embodiments of the invention, it is recognized that the consumer is not taking advantage of the insurance portion of the invention, e.g., they are not involuntarily becoming unemployed, and the monthly fee may be reduced to reflect and reward this favorable behavior, thus increasing the savings component of the product. The following examples illustrate other benefits of the invention, especially relating to unemployment and situations where market investments fail to provide positive returns.

Turning to Appendix C, Consumer two, two columns of data are presented for the consumer: the left column where the consumer contributes $180.00 per month to the invention for a six year period and the right column where an equal sum is deposited in a certificate of deposit (CD). According to the invention, $30.00 of the monthly contribution satisfies an unemployment insurance premium, while $150.00 of the contribution funds a savings instrument, e.g., mutual fund, earning a rate of return tied to the S&P 500 Index, which is returning 13% according to this example.

As can be seen from the data, the consumer utilizing the invention is unemployed between months 8 through 12 and months 43 through 48. During these periods of unemployment, the consumer receives an unemployment insurance benefit of $750.00 and a savings contribution of $150.00, continuing the savings pattern even through periods of unemployment. At the end of the 72-month period, the consumer, when utilizing the invention, has as a savings balance of $15,078.00 and has received $9,000.00 in unemployment benefits. This value is offset by the consumer's contribution of $1,800.00 in fees to the financial product of the instant invention. Comparatively, where the consumer does not take advantage of the present invention, their total savings at the close of the 72-month period is $14,653.00 assuming a rate of return of 5% for the CD.

A third scenario is presented in Appendix C, Consumer three. As in the previous examples, the observation period is 72 months. Here, however, both data columns have the savings contribution invested in a financial product tied to the S&P 500, which in this example has a rate of return of −8%, e.g., an overall loss for the sample period. Using the invention (left column), the consumer contributes $10,000.00 at month one, and continues to contribute payments in satisfaction of the fee, which provides insurance benefits during months 7 though 12 and 43 through 48, in addition to other insurance benefits. The right data column presents the same consumer not taking advantage of the invention, making an initial contribution of $10,000.00 in the first month, and $30.00 each month while employed for the 72-month observation period.

Utilizing the invention, which provides a savings insurance component, the consumer protects their savings investment in addition to receiving $9,000 in insurance benefits for the periods of unemployment. Failure to use the invention, however, results in a loss for the consumer, who is left with $7,493.00 on a contribution of $11,800. Moreover, when the invention is utilized, the consumer continues to contribute to his or her savings even through periods of unemployment Appendix C, Consumer four presents a final scenario that differs slightly from Appendix C, Consumer three. In this example, where the consumer does not take advantage of the invention (right column), the contribution is made to a CD with a 5% rate of return instead of contributing to a savings product tied to the S&P 500. At the end of the observation period, the consumer is left with $15,481.00 in savings. As in the previous example, however, the invention protects the consumer's savings investment (no principal is lost due to the 8% decline in the S&P 500) and provides $9,000.00 in insurance benefits due to the consumer's involuntary unemployment (left column).

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

APPENDIX A

CONSUMER HOUSEHOLD RISK IDENTIFICATION

| Risk profile | Average unemployment rate | Exemplary occupations | Percentage total workers | Total workers |
|---|---|---|---|---|
| High | 9.6% | Cleaners, laborers, construction, service industry | 32.7% | 29 Million |
| Medium | 5.1% | Transportation, sales, clerical administrative | 36.8% | 33 Million |
| Low | 2.7% | Repair, executives, professionals | 30.5% | 27 Million |

APPENDIX B

EXEMPLARY RISK RATING CALCULATIONS

| Occupation | Household unemployment risk | Household risk intolerance | Risk score |
|---|---|---|---|
| Retail sales clerk | High | High | Very strong |
| Bank teller | High | Moderate | Strong |
| White collar manager | Low | Moderate | Moderate |
| Lawyer | Low | Low | Low |

APPENDIX C

Consumer One

| month | monthly fee | IUI benefit | savings contrib's | savings balance |
|---|---|---|---|---|
| 1 | 30 | 0 | 150 | 280.58 |
| 2 | 30 | 0 | 150 | 278.13 |
| 3 | 30 | 0 | 150 | 275.72 |
| 4 | 30 | 0 | 150 | 273.34 |
| 5 | 30 | 0 | 150 | 270.97 |
| 6 | 30 | 0 | 150 | 268.62 |
| 7 | 30 | 0 | 150 | 266.30 |
| 8 | 30 | 0 | 150 | 263.89 |
| 9 | 30 | 0 | 150 | 261.71 |
| 10 | 30 | 0 | 150 | 259.44 |
| 11 | 30 | 0 | 150 | 257.19 |
| 12 | 30 | 0 | 150 | 254.97 |
| 13 | 30 | 0 | 150 | 252.78 |
| 14 | 30 | 0 | 150 | 250.57 |
| 15 | 30 | 0 | 150 | 248.40 |
| 16 | 30 | 0 | 150 | 245.25 |
| 17 | 30 | 0 | 150 | 244.12 |
| 18 | 30 | 0 | 150 | 242.00 |
| 19 | 30 | 0 | 150 | 239.91 |
| 20 | 30 | 0 | 150 | 237.83 |
| 21 | 30 | 0 | 150 | 235.77 |
| 22 | 30 | 0 | 150 | 233.73 |
| 23 | 30 | 0 | 150 | 231.71 |
| 24 | 30 | 0 | 150 | 229.70 |
| 25 | 30 | 0 | 150 | 227.71 |
| 26 | 30 | 0 | 150 | 225.74 |
| 27 | 30 | 0 | 150 | 223.73 |
| 28 | 30 | 0 | 150 | 221.85 |
| 29 | 30 | 0 | 150 | 219.93 |
| 30 | 30 | 0 | 150 | 218.02 |
| 31 | 30 | 0 | 150 | 216.13 |
| 32 | 30 | 0 | 150 | 214.28 |
| 33 | 30 | 0 | 150 | 212.41 |
| 34 | 30 | 0 | 150 | 210.57 |
| 35 | 30 | 0 | 150 | 206.74 |
| 36 | 30 | 0 | 150 | 205.94 |
| 37 | 30 | 0 | 150 | 205.14 |
| 38 | 30 | 0 | 150 | 203.37 |
| 39 | 30 | 0 | 150 | 201.61 |
| 40 | 30 | 0 | 150 | 199.86 |
| 41 | 30 | 0 | 150 | 196.13 |
| 42 | 30 | 0 | 150 | 196.42 |
| 43 | 30 | 0 | 150 | 194.71 |
| 44 | 30 | 0 | 150 | 193.03 |
| 45 | 30 | 0 | 150 | 191.36 |
| 46 | 30 | 0 | 150 | 189.70 |
| 47 | 30 | 0 | 150 | 188.08 |
| 48 | 30 | 0 | 150 | 186.43 |
| 49 | 30 | 0 | 150 | 184.82 |
| 50 | 30 | 0 | 150 | 183.21 |
| 51 | 30 | 0 | 150 | 181.63 |
| 52 | 30 | 0 | 150 | 180.06 |
| 53 | 30 | 0 | 150 | 178.50 |
| 54 | 30 | 0 | 150 | 176.95 |
| 55 | 30 | 0 | 150 | 175.42 |
| 56 | 30 | 0 | 150 | 173.90 |
| 57 | 30 | 0 | 150 | 172.33 |
| 58 | 30 | 0 | 150 | 170.90 |
| 59 | 30 | 0 | 150 | 169.42 |
| 60 | 30 | 0 | 150 | 167.95 |
| 61 | 30 | 0 | 150 | 166.50 |
| 62 | 30 | 0 | 150 | 165.06 |
| 63 | 30 | 0 | 150 | 163.63 |
| 64 | 30 | 0 | 150 | 162.21 |
| 65 | 30 | 0 | 150 | 160.81 |
| 66 | 30 | 0 | 150 | 159.42 |
| 67 | 30 | 0 | 150 | 158.03 |
| 68 | 30 | 0 | 150 | 158.67 |
| 69 | 30 | 0 | 150 | 155.31 |
| 70 | 30 | 0 | 150 | 153.96 |
| 71 | 30 | 0 | 150 | 152.63 |
| 72 | 30 | 0 | 150 | 151.31 |
| totals | 2160 | — | 10,800 | 15,078 |

APPENDIX C-continued

Consumer One

| month | monthly fee | IUI benefit | savings contrib's | savings balance |
|---|---|---|---|---|
| 1 | 0 | 0 | 180 | 374.75 |
| 2 | 0 | 0 | 180 | 370.95 |
| 3 | 0 | 0 | 180 | 367.19 |
| 4 | 0 | 0 | 180 | 363.47 |
| 5 | 0 | 0 | 180 | 359.79 |
| 6 | 0 | 0 | 180 | 356.15 |
| 7 | 0 | 0 | 180 | 362.54 |
| 8 | 0 | 0 | 180 | 348.98 |
| 9 | 0 | 0 | 180 | 345.63 |
| 10 | 0 | 0 | 180 | 341.93 |
| 11 | 0 | 0 | 180 | 338.46 |
| 12 | 0 | 0 | 180 | 335.03 |
| 13 | 0 | 0 | 180 | 331.64 |
| 14 | 0 | 0 | 180 | 328.28 |
| 15 | 0 | 0 | 180 | 324.96 |
| 16 | 0 | 0 | 180 | 321.66 |
| 17 | 0 | 0 | 180 | 318.40 |
| 18 | 0 | 0 | 180 | 315.17 |
| 19 | 0 | 0 | 180 | 311.96 |
| 20 | 0 | 0 | 180 | 308.82 |
| 21 | 0 | 0 | 180 | 305.89 |
| 22 | 0 | 0 | 180 | 302.59 |
| 23 | 0 | 0 | 180 | 299.52 |
| 24 | 0 | 0 | 180 | 296.49 |
| 25 | 0 | 0 | 180 | 293.49 |
| 26 | 0 | 0 | 180 | 290.51 |
| 27 | 0 | 0 | 180 | 287.57 |
| 28 | 0 | 0 | 180 | 284.65 |
| 29 | 0 | 0 | 180 | 281.77 |
| 30 | 0 | 0 | 180 | 278.91 |
| 31 | 0 | 0 | 180 | 276.09 |
| 32 | 0 | 0 | 180 | 273.29 |
| 33 | 0 | 0 | 180 | 270.52 |
| 34 | 0 | 0 | 180 | 267.78 |
| 35 | 0 | 0 | 180 | 285.07 |
| 36 | 0 | 0 | 180 | 262.58 |
| 37 | 0 | 0 | 180 | 259.72 |
| 38 | 0 | 0 | 180 | 257.09 |
| 39 | 0 | 0 | 180 | 254.46 |
| 40 | 0 | 0 | 180 | 251.91 |
| 41 | 0 | 0 | 180 | 249.95 |
| 42 | 0 | 0 | 180 | 246.83 |
| 43 | 0 | 0 | 180 | 244.33 |
| 44 | 0 | 0 | 180 | 241.85 |
| 45 | 0 | 0 | 180 | 239.40 |
| 46 | 0 | 0 | 180 | 236.97 |
| 47 | 0 | 0 | 180 | 234.57 |
| 48 | 0 | 0 | 180 | 232.19 |
| 49 | 0 | 0 | 180 | 229.84 |
| 50 | 0 | 0 | 180 | 227.51 |
| 51 | 0 | 0 | 180 | 225.21 |
| 52 | 0 | 0 | 180 | 222.93 |
| 53 | 0 | 0 | 180 | 220.57 |
| 54 | 0 | 0 | 180 | 218.43 |
| 55 | 0 | 0 | 180 | 216.22 |
| 56 | 0 | 0 | 180 | 214.03 |
| 57 | 0 | 0 | 180 | 211.86 |
| 58 | 0 | 0 | 180 | 209.71 |
| 59 | 0 | 0 | 180 | 207.69 |
| 60 | 0 | 0 | 180 | 205.48 |
| 61 | 0 | 0 | 180 | 203.40 |
| 62 | 0 | 0 | 180 | 201.34 |
| 63 | 0 | 0 | 180 | 199.30 |
| 64 | 0 | 0 | 180 | 197.28 |
| 65 | 0 | 0 | 180 | 195.28 |
| 66 | 0 | 0 | 180 | 193.30 |
| 67 | 0 | 0 | 180 | 191.34 |
| 68 | 0 | 0 | 180 | 189.40 |
| 69 | 0 | 0 | 180 | 187.48 |
| 70 | 0 | 0 | 180 | 185.58 |
| 71 | 0 | 0 | 180 | 183.70 |
| 72 | 0 | 0 | 180 | 181.84 |
| totals | — | — | 12,960 | 19,219 |

APPENDIX C

Consumer Two

| month | monthly fee | IUI benefit | savings contrib's | savings balance |
|---|---|---|---|---|
| 1 | 30 | 0 | 150 | 280.56 |
| 2 | 30 | 0 | 150 | 278.13 |
| 3 | 30 | 0 | 150 | 275.72 |
| 4 | 30 | 0 | 150 | 273.34 |
| 5 | 30 | 0 | 150 | 270.97 |
| 6 | 30 | 0 | 150 | 268.62 |
| 7 | 0 | 750 | 150 | 266.30 |
| 8 | 0 | 750 | 150 | 263.99 |
| 9 | 0 | 750 | 150 | 261.71 |
| 10 | 0 | 750 | 150 | 259.44 |
| 11 | 0 | 750 | 150 | 257.19 |
| 12 | 0 | 750 | 150 | 254.97 |
| 13 | 30 | 0 | 150 | 252.78 |
| 14 | 30 | 0 | 150 | 250.57 |
| 15 | 30 | 0 | 150 | 248.40 |
| 16 | 30 | 0 | 150 | 246.25 |
| 17 | 30 | 0 | 150 | 244.12 |
| 18 | 30 | 0 | 150 | 242.00 |
| 19 | 30 | 0 | 150 | 239.91 |
| 20 | 30 | 0 | 150 | 237.83 |
| 21 | 30 | 0 | 150 | 236.77 |
| 22 | 30 | 0 | 150 | 233.73 |
| 23 | 30 | 0 | 150 | 231.71 |
| 24 | 30 | 0 | 150 | 229.70 |
| 25 | 30 | 0 | 150 | 227.71 |
| 26 | 30 | 0 | 150 | 225.74 |
| 27 | 30 | 0 | 150 | 223.78 |
| 28 | 30 | 0 | 150 | 221.85 |
| 29 | 30 | 0 | 150 | 219.93 |
| 30 | 30 | 0 | 150 | 218.02 |
| 31 | 30 | 0 | 150 | 216.13 |
| 32 | 30 | 0 | 150 | 214.26 |
| 33 | 30 | 0 | 150 | 212.41 |
| 34 | 30 | 0 | 150 | 210.57 |
| 35 | 30 | 0 | 150 | 208.74 |
| 36 | 30 | 0 | 150 | 206.94 |
| 37 | 30 | 0 | 150 | 205.14 |
| 38 | 30 | 0 | 150 | 203.37 |
| 39 | 30 | 0 | 150 | 201.61 |
| 40 | 30 | 0 | 150 | 199.86 |
| 41 | 30 | 0 | 150 | 198.13 |
| 42 | 30 | 0 | 150 | 196.42 |
| 43 | 0 | 750 | 150 | 194.71 |
| 44 | 0 | 750 | 150 | 193.03 |
| 45 | 0 | 750 | 150 | 191.36 |
| 46 | 0 | 750 | 150 | 189.70 |
| 47 | 0 | 750 | 150 | 188.06 |
| 48 | 0 | 750 | 150 | 186.43 |
| 49 | 30 | 0 | 150 | 184.82 |
| 50 | 30 | 0 | 150 | 183.21 |
| 51 | 30 | 0 | 150 | 181.63 |
| 52 | 30 | 0 | 150 | 180.06 |
| 53 | 30 | 0 | 150 | 178.50 |
| 54 | 30 | 0 | 150 | 176.95 |
| 55 | 30 | 0 | 150 | 175.42 |
| 56 | 30 | 0 | 150 | 173.90 |
| 57 | 30 | 0 | 150 | 172.39 |
| 58 | 30 | 0 | 150 | 170.90 |
| 59 | 30 | 0 | 150 | 169.42 |
| 60 | 30 | 0 | 150 | 167.95 |
| 61 | 30 | 0 | 150 | 166.50 |
| 62 | 30 | 0 | 150 | 165.06 |
| 63 | 30 | 0 | 150 | 163.63 |
| 64 | 30 | 0 | 150 | 162.21 |
| 65 | 30 | 0 | 150 | 160.81 |
| 66 | 30 | 0 | 150 | 159.42 |
| 67 | 30 | 0 | 150 | 158.03 |
| 68 | 30 | 0 | 150 | 156.67 |
| 69 | 30 | 0 | 150 | 155.31 |
| 70 | 30 | 0 | 150 | 153.96 |
| 71 | 30 | 0 | 150 | 152.63 |
| 72 | 30 | 0 | 150 | 151.31 |
| totals | 1,800 | 9,000 | 10,800 | 15,078 |

APPENDIX C-continued

Consumer Two

| month | monthly fee | IUI benefit | savings contrib's | savings balance |
|---|---|---|---|---|
| 1 | 0 | 0 | 180 | 241.22 |
| 2 | 0 | 0 | 180 | 240.24 |
| 3 | 0 | 0 | 180 | 239.28 |
| 4 | 0 | 0 | 180 | 238.29 |
| 5 | 0 | 0 | 180 | 237.33 |
| 6 | 0 | 0 | 180 | 236.36 |
| 7 | 0 | 0 | 180 | 196.17 |
| 8 | 0 | 0 | 180 | 195.37 |
| 9 | 0 | 0 | 180 | 194.58 |
| 10 | 0 | 0 | 180 | 193.79 |
| 11 | 0 | 0 | 180 | 193.01 |
| 12 | 0 | 0 | 180 | 192.22 |
| 13 | 0 | 0 | 180 | 229.73 |
| 14 | 0 | 0 | 180 | 228.80 |
| 15 | 0 | 0 | 180 | 227.87 |
| 16 | 0 | 0 | 180 | 226.95 |
| 17 | 0 | 0 | 180 | 226.02 |
| 18 | 0 | 0 | 180 | 225.11 |
| 19 | 0 | 0 | 180 | 224.19 |
| 20 | 0 | 0 | 180 | 223.28 |
| 21 | 0 | 0 | 180 | 222.38 |
| 22 | 0 | 0 | 180 | 221.48 |
| 23 | 0 | 0 | 180 | 220.58 |
| 24 | 0 | 0 | 180 | 219.88 |
| 25 | 0 | 0 | 180 | 218.79 |
| 26 | 0 | 0 | 180 | 217.90 |
| 27 | 0 | 0 | 180 | 217.02 |
| 28 | 0 | 0 | 180 | 216.14 |
| 29 | 0 | 0 | 180 | 215.25 |
| 30 | 0 | 0 | 180 | 214.39 |
| 31 | 0 | 0 | 180 | 213.52 |
| 32 | 0 | 0 | 180 | 212.85 |
| 33 | 0 | 0 | 180 | 211.79 |
| 34 | 0 | 0 | 180 | 210.93 |
| 35 | 0 | 0 | 180 | 210.07 |
| 36 | 0 | 0 | 180 | 209.22 |
| 37 | 0 | 0 | 180 | 206.37 |
| 38 | 0 | 0 | 180 | 207.53 |
| 39 | 0 | 0 | 180 | 206.66 |
| 40 | 0 | 0 | 180 | 205.85 |
| 41 | 0 | 0 | 180 | 205.01 |
| 42 | 0 | 0 | 180 | 204.18 |
| 43 | 0 | 0 | 180 | 169.46 |
| 44 | 0 | 0 | 180 | 166.77 |
| 45 | 0 | 0 | 180 | 168.09 |
| 46 | 0 | 0 | 180 | 167.40 |
| 47 | 0 | 0 | 180 | 166.73 |
| 48 | 0 | 0 | 180 | 166.05 |
| 49 | 0 | 0 | 180 | 198.45 |
| 50 | 0 | 0 | 180 | 197.84 |
| 51 | 0 | 0 | 180 | 196.84 |
| 52 | 0 | 0 | 180 | 196.04 |
| 53 | 0 | 0 | 180 | 195.25 |
| 54 | 0 | 0 | 180 | 194.46 |
| 55 | 0 | 0 | 180 | 193.67 |
| 56 | 0 | 0 | 180 | 192.88 |
| 57 | 0 | 0 | 180 | 192.10 |
| 58 | 0 | 0 | 180 | 191.32 |
| 59 | 0 | 0 | 180 | 190.54 |
| 60 | 0 | 0 | 180 | 189.77 |
| 61 | 0 | 0 | 180 | 189.00 |
| 62 | 0 | 0 | 180 | 188.23 |
| 63 | 0 | 0 | 180 | 187.47 |
| 64 | 0 | 0 | 180 | 186.71 |
| 65 | 0 | 0 | 180 | 185.95 |
| 66 | 0 | 0 | 180 | 185.20 |
| 67 | 0 | 0 | 180 | 184.45 |
| 68 | 0 | 0 | 180 | 183.70 |
| 69 | 0 | 0 | 180 | 182.95 |
| 70 | 0 | 0 | 180 | 182.21 |
| 71 | 0 | 0 | 180 | 181.47 |
| 72 | 0 | 0 | 180 | 180.73 |
| totals | — | — | 12,600 | 14,853 |

APPENDIX C

Consumer Three

| month | monthly fee | IUI benefit | savings contrib's | savings balance |
|---|---|---|---|---|
| 1 | 30 | 0 | 10,000 | 5,314.41 |
| 2 | 30 | 0 | 0 | — |
| 3 | 30 | 0 | 0 | — |
| 4 | 30 | 0 | 0 | — |
| 5 | 30 | 0 | 0 | — |
| 6 | 30 | 0 | 0 | — |
| 7 | 0 | 750 | 0 | — |
| 8 | 0 | 750 | 0 | — |
| 9 | 0 | 750 | 0 | — |
| 10 | 0 | 750 | 0 | — |
| 11 | 0 | 750 | 0 | — |
| 12 | 0 | 750 | 0 | — |
| 13 | 30 | 0 | 0 | — |
| 14 | 30 | 0 | 0 | — |
| 15 | 30 | 0 | 0 | — |
| 16 | 30 | 0 | 0 | — |
| 17 | 30 | 0 | 0 | — |
| 18 | 30 | 0 | 0 | — |
| 19 | 30 | 0 | 0 | — |
| 20 | 30 | 0 | 0 | — |
| 21 | 30 | 0 | 0 | — |
| 22 | 30 | 0 | 0 | — |
| 23 | 30 | 0 | 0 | — |
| 24 | 30 | 0 | 0 | — |
| 25 | 30 | 0 | 0 | — |
| 26 | 30 | 0 | 0 | — |
| 27 | 30 | 0 | 0 | — |
| 28 | 30 | 0 | 0 | — |
| 29 | 30 | 0 | 0 | — |
| 30 | 30 | 0 | 0 | — |
| 31 | 30 | 0 | 0 | — |
| 32 | 30 | 0 | 0 | — |
| 33 | 30 | 0 | 0 | — |
| 34 | 30 | 0 | 0 | — |
| 35 | 30 | 0 | 0 | — |
| 36 | 30 | 0 | 0 | — |
| 37 | 30 | 0 | 0 | — |
| 38 | 30 | 0 | 0 | — |
| 39 | 30 | 0 | 0 | — |
| 40 | 30 | 0 | 0 | — |
| 41 | 30 | 0 | 0 | — |
| 42 | 30 | 0 | 0 | — |
| 43 | 0 | 750 | 0 | — |
| 44 | 0 | 750 | 0 | — |
| 45 | 0 | 750 | 0 | — |
| 46 | 0 | 750 | 0 | — |
| 47 | 0 | 750 | 0 | — |
| 48 | 0 | 750 | 0 | — |
| 49 | 30 | 0 | 0 | — |
| 50 | 30 | 0 | 0 | — |
| 51 | 30 | 0 | 0 | — |
| 52 | 30 | 0 | 0 | — |
| 53 | 30 | 0 | 0 | — |
| 54 | 30 | 0 | 0 | — |
| 55 | 30 | 0 | 0 | — |
| 56 | 30 | 0 | 0 | — |
| 57 | 30 | 0 | 0 | — |
| 58 | 30 | 0 | 0 | — |
| 59 | 30 | 0 | 0 | — |
| 60 | 30 | 0 | 0 | — |
| 61 | 30 | 0 | 0 | — |
| 62 | 30 | 0 | 0 | — |
| 63 | 30 | 0 | 0 | — |
| 64 | 30 | 0 | 0 | — |
| 65 | 30 | 0 | 0 | — |
| 66 | 30 | 0 | 0 | — |
| 67 | 30 | 0 | 0 | — |
| 68 | 30 | 0 | 0 | — |
| 69 | 30 | 0 | 0 | — |
| 70 | 30 | 0 | 0 | — |
| 71 | 30 | 0 | 0 | — |
| 72 | 30 | 0 | 0 | — |
| totals | 1,800 | 9,000 | 10,000 | 10,000 |

APPENDIX C-continued

Consumer Three

| month | monthly fee | IUI benefit | savings contrib's | savings balance |
|---|---|---|---|---|
| 1 | 0 | 0 | 10,030 | 6,081.74 |
| 2 | 0 | 0 | 30 | 18.32 |
| 3 | 0 | 0 | 30 | 18.45 |
| 4 | 0 | 0 | 30 | 18.57 |
| 5 | 0 | 0 | 30 | 18.70 |
| 6 | 0 | 0 | 30 | 18.83 |
| 7 | 0 | 0 | 0 | — |
| 8 | 0 | 0 | 0 | — |
| 9 | 0 | 0 | 0 | — |
| 10 | 0 | 0 | 0 | — |
| 11 | 0 | 0 | 0 | — |
| 12 | 0 | 0 | 0 | — |
| 13 | 0 | 0 | 30 | 19.77 |
| 14 | 0 | 0 | 30 | 19.91 |
| 15 | 0 | 0 | 30 | 20.05 |
| 16 | 0 | 0 | 30 | 20.19 |
| 17 | 0 | 0 | 30 | 20.33 |
| 18 | 0 | 0 | 30 | 20.47 |
| 19 | 0 | 0 | 30 | 20.61 |
| 20 | 0 | 0 | 30 | 20.76 |
| 21 | 0 | 0 | 30 | 20.90 |
| 22 | 0 | 0 | 30 | 21.05 |
| 23 | 0 | 0 | 30 | 21.20 |
| 24 | 0 | 0 | 30 | 21.34 |
| 25 | 0 | 0 | 30 | 21.49 |
| 26 | 0 | 0 | 30 | 21.64 |
| 27 | 0 | 0 | 30 | 21.79 |
| 28 | 0 | 0 | 30 | 21.94 |
| 29 | 0 | 0 | 30 | 22.10 |
| 30 | 0 | 0 | 30 | 22.25 |
| 31 | 0 | 0 | 30 | 22.41 |
| 32 | 0 | 0 | 30 | 22.56 |
| 33 | 0 | 0 | 30 | 22.72 |
| 34 | 0 | 0 | 30 | 22.88 |
| 35 | 0 | 0 | 30 | 23.04 |
| 36 | 0 | 0 | 30 | 23.20 |
| 37 | 0 | 0 | 30 | 23.36 |
| 38 | 0 | 0 | 30 | 23.52 |
| 39 | 0 | 0 | 30 | 23.69 |
| 40 | 0 | 0 | 30 | 23.85 |
| 41 | 0 | 0 | 30 | 24.02 |
| 42 | 0 | 0 | 30 | 24.19 |
| 43 | 0 | 0 | 0 | — |
| 44 | 0 | 0 | 0 | — |
| 45 | 0 | 0 | 0 | — |
| 46 | 0 | 0 | 0 | — |
| 47 | 0 | 0 | 0 | — |
| 48 | 0 | 0 | 0 | — |
| 49 | 0 | 0 | 30 | 25.39 |
| 50 | 0 | 0 | 30 | 25.57 |
| 51 | 0 | 0 | 30 | 25.75 |
| 52 | 0 | 0 | 30 | 25.93 |
| 53 | 0 | 0 | 30 | 26.11 |
| 54 | 0 | 0 | 30 | 26.29 |
| 55 | 0 | 0 | 30 | 26.47 |
| 56 | 0 | 0 | 30 | 26.66 |
| 57 | 0 | 0 | 30 | 26.84 |
| 58 | 0 | 0 | 30 | 27.03 |
| 59 | 0 | 0 | 30 | 27.22 |
| 60 | 0 | 0 | 30 | 27.41 |
| 61 | 0 | 0 | 30 | 27.60 |
| 62 | 0 | 0 | 30 | 27.79 |
| 63 | 0 | 0 | 30 | 27.99 |
| 64 | 0 | 0 | 30 | 28.18 |
| 65 | 0 | 0 | 30 | 28.38 |
| 66 | 0 | 0 | 30 | 28.58 |
| 67 | 0 | 0 | 30 | 28.77 |
| 68 | 0 | 0 | 30 | 26.96 |
| 69 | 0 | 0 | 30 | 29.18 |
| 70 | 0 | 0 | 30 | 29.38 |
| 71 | 0 | 0 | 30 | 29.59 |
| 72 | 0 | 0 | 30 | 29.79 |
| totals | — | — | 11,800 | 7,493 |

APPENDIX C

Consumer Four

| month | monthly fee | IUI benefit | savings contrib's | savings balance |
|---|---|---|---|---|
| 1 | 30 | 0 | 10,000 | 5,314.41 |
| 2 | 30 | 0 | 0 | — |
| 3 | 30 | 0 | 0 | — |
| 4 | 30 | 0 | 0 | — |
| 5 | 30 | 0 | 0 | — |
| 6 | 30 | 0 | 0 | — |
| 7 | 0 | 750 | 0 | — |
| 8 | 0 | 750 | 0 | — |
| 9 | 0 | 750 | 0 | — |
| 10 | 0 | 750 | 0 | — |
| 11 | 0 | 750 | 0 | — |
| 12 | 0 | 750 | 0 | — |
| 13 | 30 | 0 | 0 | — |
| 14 | 30 | 0 | 0 | — |
| 15 | 30 | 0 | 0 | — |
| 16 | 30 | 0 | 0 | — |
| 17 | 30 | 0 | 0 | — |
| 18 | 30 | 0 | 0 | — |
| 19 | 30 | 0 | 0 | — |
| 20 | 30 | 0 | 0 | — |
| 21 | 30 | 0 | 0 | — |
| 22 | 30 | 0 | 0 | — |
| 23 | 30 | 0 | 0 | — |
| 24 | 30 | 0 | 0 | — |
| 25 | 30 | 0 | 0 | — |
| 26 | 30 | 0 | 0 | — |
| 27 | 30 | 0 | 0 | — |
| 28 | 30 | 0 | 0 | — |
| 29 | 30 | 0 | 0 | — |
| 30 | 30 | 0 | 0 | — |
| 31 | 30 | 0 | 0 | — |
| 32 | 30 | 0 | 0 | — |
| 33 | 30 | 0 | 0 | — |
| 34 | 30 | 0 | 0 | — |
| 35 | 30 | 0 | 0 | — |
| 36 | 30 | 0 | 0 | — |
| 37 | 30 | 0 | 0 | — |
| 38 | 30 | 0 | 0 | — |
| 39 | 30 | 0 | 0 | — |
| 40 | 30 | 0 | 0 | — |
| 41 | 30 | 0 | 0 | — |
| 42 | 30 | 0 | 0 | — |
| 43 | 0 | 750 | 0 | — |
| 44 | 0 | 750 | 0 | — |
| 45 | 0 | 750 | 0 | — |
| 46 | 0 | 750 | 0 | — |
| 47 | 0 | 750 | 0 | — |
| 48 | 0 | 750 | 0 | — |
| 49 | 30 | 0 | 0 | — |
| 50 | 30 | 0 | 0 | — |
| 51 | 30 | 0 | 0 | — |
| 52 | 30 | 0 | 0 | — |
| 53 | 30 | 0 | 0 | — |
| 54 | 30 | 0 | 0 | — |
| 55 | 30 | 0 | 0 | — |
| 56 | 30 | 0 | 0 | — |
| 57 | 30 | 0 | 0 | — |
| 58 | 30 | 0 | 0 | — |
| 59 | 30 | 0 | 0 | — |
| 60 | 30 | 0 | 0 | — |
| 61 | 30 | 0 | 0 | — |
| 62 | 30 | 0 | 0 | — |
| 63 | 30 | 0 | 0 | — |
| 64 | 30 | 0 | 0 | — |
| 65 | 30 | 0 | 0 | — |
| 66 | 30 | 0 | 0 | — |
| 67 | 30 | 0 | 0 | — |
| 68 | 30 | 0 | 0 | — |
| 69 | 30 | 0 | 0 | — |
| 70 | 30 | 0 | 0 | — |
| 71 | 30 | 0 | 0 | — |
| 72 | 30 | 0 | 0 | — |
| totals | 1,800 | 9,000 | 10,000 | 10,000 |

APPENDIX C-continued

Consumer Four

| month | monthly fee | IUI benefit | savings contrib's | savings balance |
|---|---|---|---|---|
| 1 | 0 | 0 | 10,030 | 13,441.16 |
| 2 | 0 | 0 | 30 | 40.04 |
| 3 | 0 | 0 | 30 | 39.88 |
| 4 | 0 | 0 | 30 | 39.72 |
| 5 | 0 | 0 | 30 | 39.55 |
| 6 | 0 | 0 | 30 | 39.39 |
| 7 | 0 | 0 | 0 | — |
| 8 | 0 | 0 | 0 | — |
| 9 | 0 | 0 | 0 | — |
| 10 | 0 | 0 | 0 | — |
| 11 | 0 | 0 | 0 | — |
| 12 | 0 | 0 | 0 | — |
| 13 | 0 | 0 | 30 | 38.29 |
| 14 | 0 | 0 | 30 | 38.13 |
| 15 | 0 | 0 | 30 | 37.96 |
| 16 | 0 | 0 | 30 | 37.82 |
| 17 | 0 | 0 | 30 | 37.67 |
| 18 | 0 | 0 | 30 | 37.52 |
| 19 | 0 | 0 | 30 | 37.37 |
| 20 | 0 | 0 | 30 | 37.21 |
| 21 | 0 | 0 | 30 | 37.06 |
| 22 | 0 | 0 | 30 | 36.91 |
| 23 | 0 | 0 | 30 | 36.76 |
| 24 | 0 | 0 | 30 | 36.81 |
| 25 | 0 | 0 | 30 | 36.47 |
| 26 | 0 | 0 | 30 | 36.32 |
| 27 | 0 | 0 | 30 | 36.17 |
| 28 | 0 | 0 | 30 | 36.02 |
| 29 | 0 | 0 | 30 | 35.88 |
| 30 | 0 | 0 | 30 | 35.73 |
| 31 | 0 | 0 | 30 | 35.59 |
| 32 | 0 | 0 | 30 | 35.44 |
| 33 | 0 | 0 | 30 | 35.30 |
| 34 | 0 | 0 | 30 | 35.15 |
| 35 | 0 | 0 | 30 | 35.01 |
| 36 | 0 | 0 | 30 | 34.87 |
| 37 | 0 | 0 | 30 | 34.73 |
| 38 | 0 | 0 | 30 | 34.59 |
| 39 | 0 | 0 | 30 | 34.45 |
| 40 | 0 | 0 | 30 | 34.31 |
| 41 | 0 | 0 | 30 | 34.17 |
| 42 | 0 | 0 | 30 | 34.03 |
| 43 | 0 | 0 | 0 | — |
| 44 | 0 | 0 | 0 | — |
| 45 | 0 | 0 | 0 | — |
| 46 | 0 | 0 | 0 | — |
| 47 | 0 | 0 | 0 | — |
| 48 | 0 | 0 | 0 | — |
| 49 | 0 | 0 | 30 | 33.06 |
| 50 | 0 | 0 | 30 | 32.94 |
| 51 | 0 | 0 | 30 | 32.81 |
| 52 | 0 | 0 | 30 | 32.67 |
| 53 | 0 | 0 | 30 | 32.54 |
| 54 | 0 | 0 | 30 | 32.41 |
| 55 | 0 | 0 | 30 | 32.28 |
| 56 | 0 | 0 | 30 | 32.15 |
| 57 | 0 | 0 | 30 | 32.02 |
| 58 | 0 | 0 | 30 | 31.89 |
| 59 | 0 | 0 | 30 | 31.76 |
| 60 | 0 | 0 | 30 | 31.53 |
| 61 | 0 | 0 | 30 | 31.50 |
| 62 | 0 | 0 | 30 | 31.37 |
| 63 | 0 | 0 | 30 | 31.24 |
| 64 | 0 | 0 | 30 | 31.12 |
| 65 | 0 | 0 | 30 | 30.99 |
| 66 | 0 | 0 | 30 | 30.87 |
| 67 | 0 | 0 | 30 | 30.74 |
| 68 | 0 | 0 | 30 | 30.62 |
| 69 | 0 | 0 | 30 | 30.49 |
| 70 | 0 | 0 | 30 | 30.37 |
| 71 | 0 | 0 | 30 | 30.24 |
| 72 | 0 | 0 | 30 | 30.12 |
| totals | — | — | 11,800 | 15,481 |

What is claimed is:

1. A computer-implemented method for accumulating assets and managing risk for a consumer utilizing software installed on one or more computing devices, the method comprising:
monitoring via a server, utilization of the software by the consumer and savings behavior of the consumer,
wherein the utilization of the software includes electronic funds transactions associated with financial institutions, and
wherein the savings behavior is based on individual fund transfers to savings or investment vehicles;
computing, via the server, a risk of the consumer involuntarily losing employment;
computing, via the server, a risk tolerance of the consumer based at least in part on the utilization of the software by the consumer and the savings behavior;
computing, via the server, correlation data by calculating a product of the risk of the consumer involuntarily losing employment and the risk tolerance of the consumer;
populating, via the server, a consumer database with the correlation data associated with the consumer;
segmenting, via the server, data representative of a plurality of consumers from the consumer database into one of a plurality of segments of a consumer space based on the correlation data;
determining, via the server, a risk rating of the consumer based on the correlation data and the plurality of segments;
prioritizing, via the server, the consumer according to the risk rating, the utilization of the software by the consumer and the savings behavior; and
determining, via the server, need for a customized risk management program for the consumer based on the prioritizing; and
generating the customized risk management program, wherein the customized risk management program connects to the financial institutions and provides benefits from the financial institutions to the consumer.

2. The method of claim 1 comprising dynamically adjusting the customized risk management program in response to changes in needs and risk tolerance.

3. The method of claim 1 wherein generating the customized risk management program comprises establishing a defined insurance benefit.

4. The method of claim 3 wherein establishing the defined insurance benefit comprises establishing an insurance benefit that pays for eligible major living expenses.

5. The method of claim 4 comprising determining that the consumer is eligible to receive the defined insurance benefit when the consumer is involuntarily unemployed.

6. The method of claim 1 wherein generating the customized risk management program comprises establishing a defined contribution vehicle.

7. The method of claim 6 wherein establishing a defined contribution vehicle comprises establishing an FDIC insured financial instrument.

8. The method of claim 6 wherein establishing a defined contribution vehicle comprises establishing a non-FDIC insured financial instrument.

9. The method of claim 6 wherein establishing a defined contribution vehicle comprises establishing a savings loss insurance.

10. The method of claim 1 wherein a generating the customized risk management program comprises establishing a defined insurance benefit and a defined contribution vehicle.

11. The method of claim 1 comprising rewarding the consumer in reaction to the consumer maintaining healthy financial practices.

12. The method of claim 11 wherein rewarding the consumer comprises reducing a premium for the savings loss insurance.

13. The method of claim 1, wherein the customized risk management program comprises a defined insurance benefit that provides the benefit to the consumer when the consumer is involuntarily unemployed, the method comprising computing a premium for the insurance benefit based on at least education of the consumer.

14. The method of claim 1, wherein the customized risk management program comprises a defined insurance benefit that provides the benefit to the consumer when the consumer is involuntarily unemployed, the method further comprising computing an expected claim cost to an insurer based on an average duration and dollar amount of the benefit.

15. The method of claim 1, wherein the customized risk management program comprises providing a defined insurance benefit to the consumer with a waiver of premium for the insurance benefit when the consumer is involuntarily unemployed.

16. The method of claim 1, wherein generating a customized risk management program comprises establishing a defined insurance benefit that pays the consumer when the consumer is involuntarily unemployed and a defined contribution savings plan unconditionally linked to the insurance benefit.

17. The method of claim 1 wherein the customized risk management program comprises an unemployment insurance vehicle and a savings plan vehicle.

18. The method of claim 17 further comprising calculating a premium for the unemployment insurance vehicle based on at least one of an occupational profile, employment history, and the savings behavior of the consumer.

19. The method of claim 17 further comprising calculating a premium reduction for the unemployment insurance vehicle based on a metric of frequency of the fund transfers to the savings or investment vehicles.

20. The method of claim 17 further comprising calculating a premium for the unemployment insurance vehicle based on at least the risk rating and the segmenting of the consumer.

21. A system for accumulating assets and managing risk for a consumer, the system comprising:
a communication network;
a consumer database configured to store risk information associated with a plurality of consumers;
one or more computing devices communicatively coupled to the communication network; and
a server communicatively coupled to the one or more computing devices over the communication network, the server configured to:
receive data including electronic funds transactions from the one or more computing devices to financial institutions;
monitor savings behavior of the consumer, wherein the savings behavior is based on individual fund transfers to savings or investment vehicles;
compute a risk of the consumer involuntarily losing employment;

compute, a risk tolerance of the consumer based at least in part on the savings behavior;

compute correlation data by calculating a product of the risk of the consumer involuntarily losing employment and the risk tolerance of the consumer;

populate the consumer database with the correlation data associated with the consumer;

segment data representative of a plurality of consumers from the consumer database into one of a plurality of segments of a consumer space based on the correlation data;

determine a risk rating of the consumer based on the correlation data and the plurality of segments;

prioritize the consumer according to the risk rating and the savings behavior; and determine need for a customized risk management program for the consumer based on the prioritizing; and generate the customized risk management program, wherein the customized risk management program connects to the financial institutions and provides benefits from the financial institutions to the consumer.

22. The system of claim 21 wherein the customized risk management program comprises an unemployment insurance vehicle and a savings plan vehicle.

23. The system of claim 22 wherein the at least one computing device is operable to calculate a premium for the unemployment insurance vehicle based on at least one of an occupational profile, employment history, and the savings behavior of the consumer.

24. The system of claim 22 wherein the at least one computing device is operable to calculate a premium reduction for the unemployment insurance vehicle based on a metric of frequency of the fund transfers to the savings or investment vehicles.

25. The system of claim 22 wherein the at least one computing device is operable to calculate a premium for the unemployment insurance vehicle based on at least the risk rating and the segmenting of the consumer.

26. A non-transitory computer readable medium having software stored thereon that when executed by at least one computing device causes the at least one computing device to perform a method for accumulating assets and managing risk for a consumer utilizing software installed on the at least one computing device, the method comprising:

monitoring utilization of the software by the consumer and savings behavior of the consumer, wherein the utilization of the software includes electronic funds transactions associated with financial institutions, and wherein the savings behavior is based on individual fund transfers to savings or investment vehicles;

computing a risk of the consumer involuntarily losing employment;

computing a risk tolerance of the consumer based at least in part on the utilization of the software by the consumer and the savings behavior;

computing correlation data by calculating a product of the risk of the consumer involuntarily losing employment and the risk tolerance of the consumer;

populating a consumer database with the correlation data associated with the consumer;

segmenting data representative of a plurality of consumers from the consumer database into one of a plurality of segments of a consumer space based on the correlation data;

determining a risk rating of the consumer based on the correlation data and the plurality of segments;

prioritizing the consumer according to the risk rating, the utilization of the software by the consumer, and the savings behavior; and determining need for a customized risk management program for the consumer based on the prioritizing; and generating the customized risk management program, wherein the customized risk management program connects to the financial institutions and provides benefits from the financial institutions to the consumer.

27. The non-transitory computer readable medium of claim 26 wherein the customized risk management program comprises an unemployment insurance vehicle and a savings plan vehicle.

28. The non-transitory computer readable medium of claim 27 further comprising computer program code for calculating a premium for the unemployment insurance vehicle based on at least one of an occupational profile, employment history, and the savings behavior of the consumer.

29. The non-transitory computer readable medium of claim 27 further comprising computer program code for calculating a premium reduction for the unemployment insurance vehicle based on a metric of frequency of the fund transfers to the savings or investment vehicles.

30. The non-transitory computer readable medium of claim 27 further comprising computer program code for calculating a premium for the unemployment insurance vehicle based on at least the risk rating and the segmenting of the consumer.

* * * * *